United States Patent [19]

Hanashiro et al.

[11] Patent Number: 5,253,052
[45] Date of Patent: Oct. 12, 1993

[54] APPARATUS FOR DETECTING RELATIVE MOTION BETWEEN CONTENTS OF SUCCESSIVE FIELDS OF A VIDEO SIGNAL

[75] Inventors: Yoshiaki Hanashiro; Taro Watanabe; Michihiro Aso; Kenji Matsuoka, all of Yokohama, Japan

[73] Assignee: Victor Company of Japan, Ltd., Yokohama, Japan

[21] Appl. No.: 867,546

[22] Filed: Apr. 13, 1992

[30] Foreign Application Priority Data

Apr. 12, 1991 [JP] Japan .................................. 3-108886
Apr. 23, 1991 [JP] Japan .................................. 3-119398

[51] Int. Cl.$^5$ .............................................. H04N 7/18
[52] U.S. Cl. ...................................... 358/105; 345/121
[58] Field of Search ................ 358/105, 222; 340/724, 340/725

[56] References Cited

U.S. PATENT DOCUMENTS 5,060,074 10/1991 Kinugasa et al. .................... 358/222
5,099,323 3/1992 Morimuta et al. ................... 358/105

FOREIGN PATENT DOCUMENTS 0180446 5/1986 European Pat. Off. .
0348207 12/1989 European Pat. Off. .
61-107886 5/1986 Japan .
61-235969 10/1986 Japan .
1190081 7/1989 Japan .
1269371 10/1989 Japan .
2241188 9/1990 Japan .

Primary Examiner—Richard Hjerpe
Assistant Examiner—Minsun Oh
Attorney, Agent, or Firm—Lowe, Price, Leblanc & Becker

[57] ABSTRACT

In an apparatus for detecting amounts of relative motion of a picture expressed by a digital video signal, between successive fields of the signal, a fixed set of picture element positions are designated as respective representative points in each field of the video signal. For each representative point, the signal level value for that point during a preceding field is compared with each of a successive of picture element values in the current field, within a corresponding comparison interval which extends prior to and subsequent to the position of that representative point in the field. In addition, a corresponding value of relative distance between each picture element for which a result is obtained and that representative point is derived as a binary value, and the result is cumulatively stored with corresponding results for other representative points in an address of one of a plurality of memory sections, with the particular memory section being assigned in accordance with the state(s) of one or more high-order bits of the corresponding relative distance value and the address being assigned in accordance with the remaining low-order bits of that distance value.

9 Claims, 20 Drawing Sheets

FIG. 3
PRIOR ART

| MEMORY SECTIONS | M0 | | | | M1 | | | | M2 | | | | M3 | | | |
|---|---|---|---|---|---|---|---|---|---|---|---|---|---|---|---|---|
| REFERENCE POINTS | P0 | P1 | P2 | P3 | P0 | P1 | P2 | P3 | P0 | P1 | P2 | P3 | P0 | P1 | P2 | P3 |
| 0 | R00 | R10 | R20 | R30 | R03 | R13 | R23 | R33 | R02 | R12 | R22 | R32 | R01 | R11 | R21 | R31 |
| 1 | R04 | R14 | R24 | R34 | R07 | | | | R06 | | | | R05 | | | |
| 2 | R08 | R18 | R28 | R38 | R011 | | | | R010 | | | | R09 | | | |
| 3 | R012 | R112 | R212 | R312 | R015 | | | | R014 | | | | R013 | | | |
| 4 | R016 | R116 | R216 | R316 | R019 | | | | R018 | | | | R017 | | | |
| 5 | R020 | R120 | R220 | R320 | R023 | | | | R022 | | | | R021 | | | |
| 6 | R024 | R124 | R224 | R324 | R027 | | | | R026 | | | | R025 | | | |
| 7 | R028 | R128 | R228 | R328 | R031 | | | | R030 | | | | R029 | | | |
| 8 | R032 | R132 | R232 | R332 | R035 | | | | R034 | | | | R033 | | | |
| 9 | R036 | R136 | R236 | R336 | R039 | | | | R038 | | | | R037 | | | |
| 10 | R040 | R140 | R240 | R340 | R043 | | | | R042 | | | | R041 | | | |
| 11 | R044 | R144 | R244 | R344 | R047 | | | | R046 | | | | R045 | | | |
| 12 | R048 | R148 | R248 | R348 | R051 | | | | R050 | | | | R049 | | | |
| 13 | R052 | R152 | R252 | R352 | R055 | | | | R054 | | | | R053 | | | |
| 14 | R056 | R156 | R256 | R356 | R059 | | | | R058 | | | | R057 | | | |
| 15 | R060 | R160 | R260 | R360 | R063 | R163 | R263 | R363 | R062 | R162 | R262 | R362 | R061 | R161 | R261 | R361 |
| 16 | R064 | R164 | R264 | R364 | | | | | | | | | | | | |
| 17 | | | | | | | | | | | | | | | | |
| 18 | | | | | | | | | | | | | | | | |

MEMORY ADDRESSES

FIG. 9

| PICTURE ELEMENT NUMBER | REPRESENTATIVE POINT WHOSE (PREVIOUS FIELD) VALUE IS SUPPLIED TO TERMINAL 69 | REPRESENTATIVE POINT WHOSE (PREVIOUS FIELD) VALUE IS SUPPLIED TO TERMINAL 69' | PICTURE ELEMENT NUMBER SUPPLIED TO TERMINAL 78 | PICTURE ELEMENT NUMBER SUPPLIED TO TERMINAL 78' |
|---|---|---|---|---|
| 0 | | | | |
| 1 | | | | |
| 2 | | | | |
| 3 | | | | |
| 4 | | | | |
| 5 | D0 | | 13 | |
| 6 | D0 | | 13 | |
| 7 | D0 | | 13 | |
| 8 | D0 | | 13 | |
| 9 | D0 | | 13 | |
| 10 | D0 | | 13 | |
| 11 | D0 | | 13 | |
| 12 | D0 | | 13 | |
| 13 | D0 | D1 | 13 | 21 |
| 14 | D0 | D1 | 13 | 21 |
| 15 | D0 | D1 | 13 | 21 |
| 16 | D0 | D1 | 13 | 21 |
| 17 | D0 | D1 | 13 | 21 |
| 18 | D0 | D1 | 13 | 21 |
| 19 | D0 | D1 | 13 | 21 |
| 20 | D0 | D1 | 13 | 21 |
| 21 | D2 | D1 | 29 | 21 |
| 22 | D2 | D1 | 29 | 21 |
| 23 | D2 | D1 | 29 | 21 |
| 24 | D2 | D1 | 29 | 21 |
| 25 | D2 | D1 | 29 | 21 |
| 26 | D2 | D1 | 29 | 21 |
| 27 | D2 | D1 | 29 | 21 |
| 28 | D2 | D1 | 29 | 21 |
| 29 | D2 | | 29 | |
| 30 | D2 | | 29 | |
| 31 | D2 | | 29 | |
| 32 | D2 | | 29 | |
| 33 | D2 | | 29 | |
| 34 | D2 | | 29 | |
| 35 | D2 | | 29 | |
| 36 | D2 | | 29 | |
| 37 | | | | |

1 HORIZONTAL LINE INTERVAL

FIG. 10a

| PICTURE ELEMENT NUMBERS | POSITIONS OF REPRESENTATIVE POINTS | RELATIVE POSITIONS | | | | | | | | |
|---|---|---|---|---|---|---|---|---|---|---|
| | | D0 | | | D1 | | | D2 | | |
| | | POSITION DESIGNATIONS | DECIMAL VALUES | BINARY VALUES | POSITION DESIGNATIONS | DECIMAL VALUES | BINARY VALUES | POSITION DESIGNATIONS | DECIMAL VALUES | BINARY VALUES |
| 0 | | | | | | | | | | |
| 1 | | | | | | | | | | |
| 2 | | | | | | | | | | |
| 3 | | | | | | | | | | |
| 4 | | | | | | | | | | |
| 5 | | W00 | −8 | 1000 | | | | | | |
| 6 | | W01 | −7 | 1001 | | | | | | |
| 7 | | W02 | −6 | 1010 | | | | | | |
| 8 | | W03 | −5 | 1011 | | | | | | |
| 9 | | W04 | −4 | 1100 | | | | | | |
| 10 | | W05 | −3 | 1101 | | | | | | |
| 11 | | W06 | −2 | 1110 | | | | | | |
| 12 | | W07 | −1 | 1111 | | | | | | |
| 13 | D0 | W08 | 0 | 0000 | | | | | | |
| 14 | | W09 | 1 | 0001 | | | | | | |
| 15 | | W010 | 2 | 0010 | W10 | −8 | 1000 | | | |
| 16 | | W011 | 3 | 0011 | W11 | −7 | 1001 | | | |
| 17 | | W012 | 4 | 0100 | W12 | −6 | 1010 | | | |
| 18 | | W013 | 5 | 0101 | W13 | −5 | 1011 | | | |
| | | | | | W14 | −4 | 1100 | | | |
| | | | | | W15 | −3 | 1101 | | | |

FIG. 10b

| PICTURE ELEMENT NUMBERS | POSITIONS OF REPRESENTATIVE POINTS | RELATIVE POSITIONS | | | | | | | | |
|---|---|---|---|---|---|---|---|---|---|---|
| | | D0 | | | D1 | | | D2 | | |
| | | POSITION DESIGNATIONS | DECIMAL VALUES | BINARY VALUES | POSITION DESIGNATIONS | DECIMAL VALUES | BINARY VALUES | POSITION DESIGNATIONS | DECIMAL VALUES | BINARY VALUES |
| 19 | | W014 | 6 | 0110 | | | | | | |
| 20 | | W015 | 7 | 0110 | | | | | | |
| 21 | D1 | | | | W16 | -2 | 1110 | | | |
| 22 | | | | | W17 | -1 | 1111 | | | |
| 23 | | | | | W18 | 0 | 0000 | | | |
| 24 | | | | | W19 | 1 | 0001 | W20 | -8 | 1000 |
| 25 | | | | | W110 | 2 | 0010 | W21 | -7 | 1001 |
| 26 | | | | | W111 | 3 | 0011 | W22 | -6 | 1010 |
| 27 | | | | | W112 | 4 | 0100 | W23 | -5 | 1011 |
| 28 | D2 | | | | W113 | 5 | 0101 | W24 | -4 | 1100 |
| 29 | | | | | W114 | 6 | 0110 | W25 | -3 | 1101 |
| 30 | | | | | W115 | 7 | 0111 | W26 | -2 | 1110 |
| 31 | | | | | | | | W27 | -1 | 1111 |
| 32 | | | | | | | | W28 | 0 | 0000 |
| 33 | | | | | | | | W29 | 1 | 0001 |
| 34 | | | | | | | | W210 | 2 | 0010 |
| 35 | | | | | | | | W211 | 3 | 0011 |
| 36 | | | | | | | | W212 | 4 | 0100 |
| 37 | | | | | | | | W213 | 5 | 0101 |
| 38 | | | | | | | | W214 | 6 | 0110 |
| 39 | | | | | | | | W215 | 7 | 0111 |

| MEMORY CIRCUIT SECTIONS | 63a | | | 63b | | |
|---|---|---|---|---|---|---|
| REPRESENTATIVE POINTS | D0 | D1 | D2 | D0 | D1 | D2 |
| MEMORY ADDRESSES 0 | W08 | W18 | W28 | W00 | W10 | W20 |
| 1 | W09 | W19 | W29 | W01 | W11 | W21 |
| 2 | W010 | W110 | W210 | W02 | W12 | W22 |
| 3 | W011 | W111 | W211 | W03 | W13 | W23 |
| 4 | W012 | W112 | W212 | W04 | W14 | W24 |
| 5 | W013 | W113 | W213 | W05 | W15 | W25 |
| 6 | W014 | W114 | W214 | W06 | W16 | W26 |
| 7 | W015 | W115 | W215 | W07 | W17 | W27 |

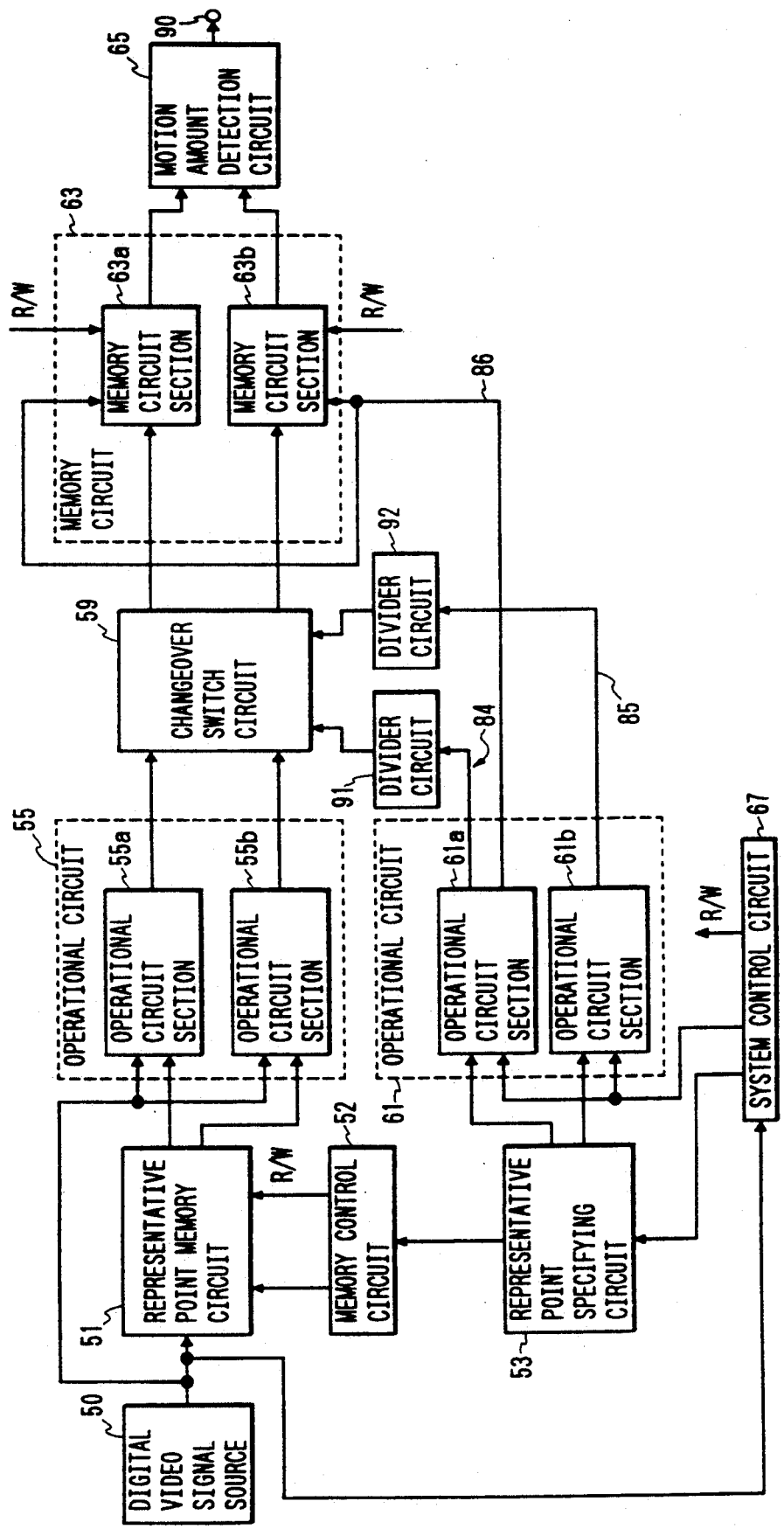

FIG. 14a

| PICTURE ELEMENT NUMBERS | POSITIONS OF REPRESENTATIVE POINTS | RELATIVE POSITIONS | | | | | | | | |
|---|---|---|---|---|---|---|---|---|---|---|
| | | D0 | | | D1 | | | D2 | | |
| | | POSITION DESIGNATIONS | DECIMAL VALUES | DIVISION RESULT BIT | POSITION DESIGNATIONS | DECIMAL VALUES | DIVISION RESULT BIT | POSITION DESIGNATIONS | DECIMAL VALUES | DIVISION RESULT BIT |
| 0 | | | | | | | | | | |
| 1 | | | | | | | | | | |
| 2 | | | | | | | | | | |
| 3 | | | | | | | | | | |
| 4 | | | | | | | | | | |
| 5 | | W00 | 0 | 0 | | | | | | |
| 6 | | W01 | 1 | 0 | | | | | | |
| 7 | | W02 | 2 | 0 | | | | | | |
| 8 | | W03 | 3 | 0 | | | | | | |
| 9 | | W04 | 4 | 0 | | | | | | |
| 10 | | W05 | 5 | 0 | | | | | | |
| 11 | | W06 | 6 | 0 | | | | | | |
| 12 | | W07 | 7 | 0 | | | | | | |
| 13 | D0 | W08 | 8 | 1 | W10 | 0 | 0 | | | |
| 14 | | W09 | 9 | 1 | W11 | 1 | 0 | | | |
| 15 | | W010 | 10 | 1 | W12 | 2 | 0 | | | |
| 16 | | W011 | 11 | 1 | W13 | 3 | 0 | | | |
| 17 | | W012 | 12 | 1 | W14 | 4 | 0 | | | |
| 18 | | W013 | 13 | 1 | W15 | 5 | 0 | | | |

FIG. 14b

| PICTURE ELEMENT NUMBERS | POSITIONS OF REPRESENTATIVE POINTS | RELATIVE POSITIONS ||||||||||
|---|---|---|---|---|---|---|---|---|---|---|
| | | D0 ||| D1 ||| D2 |||
| | | POSITION DESIGNATIONS | DECIMAL VALUES | DIVISION RESULT BIT | POSITION DESIGNATIONS | DECIMAL VALUES | DIVISION RESULT BIT | POSITION DESIGNATIONS | DECIMAL VALUES | DIVISION RESULT BIT |
| 19 | | W014 | 14 | 1 | | | | | | |
| 20 | | W015 | 15 | 1 | | | | | | |
| 21 | D1 | | | | W16 | 6 | 0 | | | |
| 22 | | | | | W17 | 7 | 0 | | | |
| 23 | | | | | W18 | 8 | 1 | | | |
| 24 | | | | | W19 | 9 | 1 | | | |
| 25 | | | | | W110 | 10 | 1 | | | |
| 26 | | | | | W111 | 11 | 1 | | | |
| 27 | | | | | W112 | 12 | 1 | | | |
| 28 | | | | | W113 | 13 | 1 | | | |
| 29 | D2 | | | | W114 | 14 | 1 | | | |
| 30 | | | | | W115 | 15 | 1 | | | |
| 31 | | | | | | | | W20 | 0 | 0 |
| 32 | | | | | | | | W21 | 1 | 0 |
| 33 | | | | | | | | W22 | 2 | 0 |
| 34 | | | | | | | | W23 | 3 | 0 |
| 35 | | | | | | | | W24 | 4 | 0 |
| 36 | | | | | | | | W25 | 5 | 0 |
| 37 | | | | | | | | W26 | 6 | 0 |
| 38 | | | | | | | | W27 | 7 | 0 |
| 39 | | | | | | | | W28 | 8 | 1 |
| | | | | | | | | W29 | 9 | 1 |
| | | | | | | | | W210 | 10 | 1 |
| | | | | | | | | W211 | 11 | 1 |
| | | | | | | | | W212 | 12 | 1 |
| | | | | | | | | W213 | 13 | 1 |
| | | | | | | | | W214 | 14 | 1 |
| | | | | | | | | W215 | 15 | 1 |

APPARATUS FOR DETECTING RELATIVE MOTION BETWEEN CONTENTS OF SUCCESSIVE FIELDS OF A VIDEO SIGNAL

BACKGROUND OF THE INVENTION

1. Field of the Invention

The present invention relates to a motion amount detection apparatus for detecting amounts of relative motion between the pictures expressed by successive fields of a video signal, such as motion resulting from camera shake in the case of a video signal produced from a compact type of video camera.

2. Description of the Related Art

FIG. 1 is a general block diagram of an example of a prior art motion amount detection apparatus, which is described in Japanese Patent laid-open No. 1-269371. Four positions, referred to as representative points, are fixedly defined by the apparatus in a specific horizontal line interval of each field of an input video signal, respectively corresponding to four picture elements of the video signal. Such a set of four representative points are illustrated in FIG. 2, designated as P0, P1, P2 and P3. These occur in the horizontal line interval with a fixed spacing of 17 picture element intervals between successive representative points, as shown.

In FIG. 1, numeral 1 denotes a source of a digital video signal, 2 denotes a representative point memory circuit for storing signal values of representative points within the video signal, and 3 denotes a memory control circuit I for controlling the representative point memory circuit 2. 4 denotes an operational circuit for operating on the signal which is read out from the representative point memory circuit 2, which constitutes representative point values from a field occurring one field or more previously, and on the output signal from the digital video signal source 1, which constitutes the current video signal. 5 denotes a detection memory circuit which is formed of a plurality of memory circuit section, for storing output signal values from the operational circuit 4. 6 denotes a memory control circuit II for controlling the detection memory circuit 5. 7 denotes a motion amount operational circuit for periodically obtaining an amount and direction of image motion based on the cumulative stored contents in the detection memory circuit 5, e.g once in each field interval. 8 denotes a representative point specifying circuit for determining the positions (within each field interval) of the representative points P0, P1, P2, P3 for which picture element Values are stored in the representative point memory circuit 2. 9 denotes an operation control circuit for controlling the representative point specifying circuit 8 and the memory control circuit 6. 10 denotes a system control circuit, for providing overall control of the aforementioned circuits.

The operation of the above circuits is as follows. A digital video signal is inputted from the digital video signal source 1, and picture element values corresponding to the representative point positions designated by the representative point specifying circuit 8 are written into the representative point memory circuit 2 under the control of the memory control circuit 3. The values which are thus written in are outputted in during respective predetermined time intervals (referred to in the following as comparison intervals) in the succeeding frame, i.e. during the current field of the video signal the representative point values for the preceding field are outputted during respective comparison intervals.

The operational circuit 4 operates on the current video signal and the representative point video signal values of the preceding frame to obtain operational result values which can be subsequently used to judge an amount of picture motion, specifically by subtracting from successive picture element values of the current field, FIG. 2, these comparison intervals successively overlap. Thus, (although not apparent from the simple block diagram of FIG. 1), pairs of result values will be outputted in parallel from the operational circuit 4 within the regions of overlap between these ranges. For example, assuming that the $n^{th}$ picture element of the horizontal line interval containing the representative points corresponds to representative point P0, then the $n^{th}$ picture element of the current field will be compared (in the operational circuit 4) with the P0 representative point value from the preceding field at the position R032 within the comparison interval $|R0|$, while at the same time being compared with the P1 representative point value from the preceding field at the position R115 within the comparison interval $|R1|$.

The basic principles of the apparatus are as follows. Each result that is obtained for a specific representative point value within a comparison interval is cumulatively added to each of the results obtained for the same relative position within each of the other three comparison intervals. Thus for example the four results obtained for the four representative points P0, P1, P2, P3 which have the relative positions R032, R132, R232 and R332 respectively, are cumulatively added and stored in one specific address of one specific memory during each comparison interval, the representative point value (from the preceding field) corresponding to that comparison interval, obtaining the absolute value of each subtraction and operating on that absolute value to obtain an operational result. These result values are cumulatively written into respectively selected ones of the memory circuit section of the detection memory circuit 5, under the control of the memory control circuit 6. In the first embodiment of that invention, there are four comparison intervals respectively corresponding to four representative points. Two of the respective ranges of these comparison intervals are illustrated in FIG. 2, designated as $|R0|$ and $|R1|$ respectively. As shown, each comparison interval is equal to 64 picture element intervals, i.e. four times the spacing between adjacent representative points. Positions within each comparison interval with respect to the representative point of that interval are expressed by respective sets of designations, two of which these sets, R00 to R064, and R10 to R164 being shown in FIG. 2, i.e. each set consists of 64 picture element positions. In the following, the distance between such a position within a comparison interval and the corresponding representative point will be designated as a relative distance value. As shown in circuit section of the detection memory circuit 5. FIG. 3 illustrates how the results obtained for the various relative positions R00 etc. are stored in respective addresses and memory circuit sections of the detection memory circuit 5. Upon completion of such a cumulative addition and storage operation for the four successive representative points, if for example there has been no relative movement of the picture expressed by the current field with respect to the preceding field, then the final cumulative result obtained for the four representative point positions (which is stored in address 8 of the memory circuit section M0 as shown in FIG. 3), will be the smallest of all of the cumulative results that are left stored in the addresses of each of the memory circuit sections M0, M1, M2 and M3. Hence, the motion amount detection circuit 7 will judge in this case that there has been no picture motion, based on the contents left stored in the detection memory circuit 5.

Conversely if there has been some relative picture motion (in the horizontal direction, in this example), then the smallest value of cumulative result will be left in some other address of one of the memory circuit section M0 or of M1, M2 or M3. The amount and direction of the motion can be judged by the motion amount detection circuit 7 based on the memory location of that minimum cumulative result.

With that prior art apparatus, it is necessary to provide a set of n memory circuit sections, where n is a natural number, and the spacing between two successive representative points is set as (n.N +1), where N is a natural number representing the number of memory circuit sections and n is a coefficient. n and N are each equal to 4 in the prior art example being described. To determine the memory circuit section to which an operational result value is to be written, the distance between the relative position for that result and the corresponding representative point is divided by N, and the value of the remainder determines the memory circuit section into which the result is to be written. For example, the distance between the relative position R00 (in the comparison interval |R0|) and the corresponding representative point P0 is equal to 32. The remainder from dividing 32 by 4 is zero, so that each result obtained for the relative position R00 will be written into the memory circuit section M0.

However with such an apparatus, various practical problems arise. Firstly, successively adjacent result values must be written into successively different ones of the memory circuit sections. For example, results obtained for the relative positions R00, R01, R02 and R03 must be written into the memory circuit sections M0, M3, M2 and M1 respectively, as shown in FIG. 3, although these result values are obtained in continous succession by the operational circuit 4. This is due to the fact that of course respectively different values of division remainder will be obtained for successive relative positions, within each of the comparison intervals |R0| to |R3|.

Furthermore, when two result values are obtained in parallel for two different comparison intervals (for example, values obtained for the positions R032 and R115 each based on comparison with the $n^{th}$ picture element of the current field as illustrated in FIG. 2), these two values must be written into respectively different addresses. Thus, memory control for the motion amount detection circuit 7 is complex, and so the memory control circuit scale must be large.

A second basic problem which arises with prior art types of motion amount detection apparatus is that it has been difficult to reduce the number of bits used for the digital signals that are processed by the apparatus. It is desirable to use only a small number of bits to express each digital value, in order to minimize the circuit scale, i.e. a smaller number of bits than is required to express the full dynamic range of the input digital video signal. To achieve that objective, it has been proposed in the prior art (for example in Japanese Patent laid-open No. 2-241188) to operate on the input digital video signal of such an apparatus by removing high-order bits from of each digital value of the input signal. However the problem of overflow between corresponding picture element values of successive fields will arise with such a method. For example, assuming for simplicity that each picture element value of the input digital video signal is expressed by 8 bits and that a representative point has the binary value "0 0 0 0 1 1 1 1" in one field, i.e. the MSB is 0 and the LSB is 1, and has the value "0 0 0 1 0 0 0 0" in the succeeding field, then if the high-order three bits are removed, no error will result when the remaining two sets of low-order bits are compared. However if the four high-order bits are removed, then a comparison error will occur, i.e. the values "1 1 1 1" and "0 0 0 0" will be compared. Thus if such a simple removal method is utilized and a large reduction in the number of bits is achieved, then there may be errors in the absolute values that are obtained from comparisons of the representative point values.

SUMMARY OF THE INVENTION

To overcome the first of the prior art problems described above, whereby it is necessary to use complex circuits for controlling the operation of the detection memory circuit, the present invention provides a motion amount detection apparatus in which the respective addresses and memory sections to which operational result values are assigned are determined in accordance with values of sets of low-order bits and high-order bits, respectively, of relative position values each of which defines a position, in relation to a representative point, at which an operational result value is obtained. More specifically, in each field, the value of a representative point during a preceding field of the digital video signal is compared with a set of data values of the video signal during the current field, with that set of data values corresponding to a comparison interval which extends prior to and subsequent to the representative point position in the field. Each time that a result value is obtained by comparing a data value of the current field with the representative point value from the preceding field, a value of relative distance between that data value and the position of the representative point is also derived. In the simplest case in which a detection memory circuit formed of only two sections is utilized, the state of the MSB of the aforementioned relative distance value is used to assign the result value to one of the two memory sections. The remaining low-order bits of the relative distance value are used to define the memory address to which the result value will be assigned.

As a result, the memory control operations become extremely simple, so that the circuit scale required can be substantially reduced by comparison with the prior art.

More specifically, according to one aspect the invention provides a motion amount detection apparatus for operating on successive picture element values of an input digital video signal to detect amounts of relative motion between picture contents of sequentially occurring fields of said video signal, comprising:

representative point specifying means for specifying respective positions of a plurality of representative points within each field of said digital video signal;

a first memory circuit controlled by said representative point specifying means for operating during a current field of said digital video signal to store respective picture element values of said representative points of said current field while outputting each representative point value of a preceding field during a corresponding comparison interval, said comparison interval extending prior to and subsequent to the corresponding representative point;

first operational circuit means operating during each of said comparison intervals for comparing successive picture element values of the input digital video signal with the preceding field representative point value corresponding to said each comparison interval, to obtain respective sets of operational result values in each of said comparison intervals;

second operational circuit means for deriving, for each of said sets of operational result values, a corresponding set of relative distance values, wherein each relative distance value is a binary number representing a relative distance between the picture element corresponding to result value and the corresponding representative point;

a second memory circuit formed of a plurality of memory sections each having an identical number of addresses and each functioning to cumulatively store successive operational result values values supplied thereto in respective addresses, each addresses for storing a result value being specified by a fixed set of low-order bits of the relative distance value corresponding to said result value;

selector circuit means for transferring each of said operational result values to one of said plurality of memory circuit sections selected in accordance with a combination of states of a set of high-order bits of said corresponding relative distance value, said set consisting of at least the most significant bit of said corresponding relative distance value; and motion amount detection circuit means for periodically deriving an amount of relative picture motion, based on cumulative stored values contained in said operational result value memory means.

Each of said operational result values produced by the first operational circuit means may be derived based on calculation of an amount of absolute difference between a picture element value of the current field and a representative point picture element value of the preceding field.

To overcome the second prior art problem described above, whereby it is difficult to reduce the number of bits used for the digital signal values that are operated on by such a motion amount detection apparatus, the apparatus is further provided with means for executing level detection of the input digital video signal during the current field, and for multiplying the digital video signal by a factor whose value is determined in accordance with the level detection result. The resultant signal is then limited in absolute value. The resultant amplitude-limited digital video signal can thereby be expressed by a smaller number of bits than is necessary for the input digital video signal, i.e. by removing one or more high-order bits, without the danger of inaccuracy resulting from overflow due to the elimination of the high-order bits.

More specifically, such a motion amount detection apparatus further comprises a signal level control circuit for controlling the level of the input digital video signal, including:

peak detection circuit means for detecting peak level values of said input video signal and for producing multiplication factor selection control data which vary in accordance with said peak level values;

latch circuit means for temporarily holding said multiplication factor selection controlled data and for outputting, in a current field of said input digital video signal, delayed multiplication factor selection control data which were produced in said preceding field;

selectable factor multiplier circuit means including first multiplication factor selection circuit means responsive to said multiplication factor selection control data from said peak detection circuit means for multiplying said input digital video signal by a factor which is predetermined in accordance with said selection control data, to produce a first level-modified digital video signal, and second multiplication factor selection circuit means responsive to said delayed multiplication factor selection control data from said latch circuit circuit means for multiplying said input digital video signal by a factor which is predetermined in accordance with said delayed selection control data;

clipping circuit means for executing limiting of absolute values of said first level-modified digital video signal, and for supplying a resultant digital video signal to said representative point memory circuit, and second clipping circuit means for executing limiting of absolute values of said second level-modified digital video signal, and supplying a resultant digital video signal to said first operational circuit means.

The selectable factor multiplier circuit means of such an apparatus preferably further comprises means for removing a predetermined number of low-order bits, extending from the least significant bit, from each data value of said first and second level-modified digital video signals, before transferring said level-modified digital video signals to said first and second clipping circuit means.

In addition, such an apparatus preferably further comprises filter circuit means for removing high-frequency components of said input digital video signal, and for supplying a resultant filtered input digital video signal to said selectable factor multiplier means and to said peak detection circuit means.

BRIEF DESCRIPTION OF THE DRAWINGS

FIG. 3 is a table illustrating the allocation of operational result values to respective addresses of respective memory circuit sections in the apparatus of FIG. 1;

FIG. 9 is a diagram for illustrating timing relationships between input data values supplied to the circuits of FIGS. 6 and 7;

FIGS. 10A and 10B are a table for illustrating the relationship between successive input data values of the digital video signal and respective relative positions in the comparison ranges for respective representative points, in the embodiment of FIG. 4;

FIG. 12 is a block diagram of a second embodiment of a motion amount detection apparatus according to the present invention;

FIGS. 14A and 14B are a table for illustrating the relationship between successive input data values of the digital video signal and respective relative positions in the comparison ranges for respective representative points, in the embodiment of FIG. 12;

DESCRIPTION OF PREFERRED EMBODIMENTS

Figure 4:
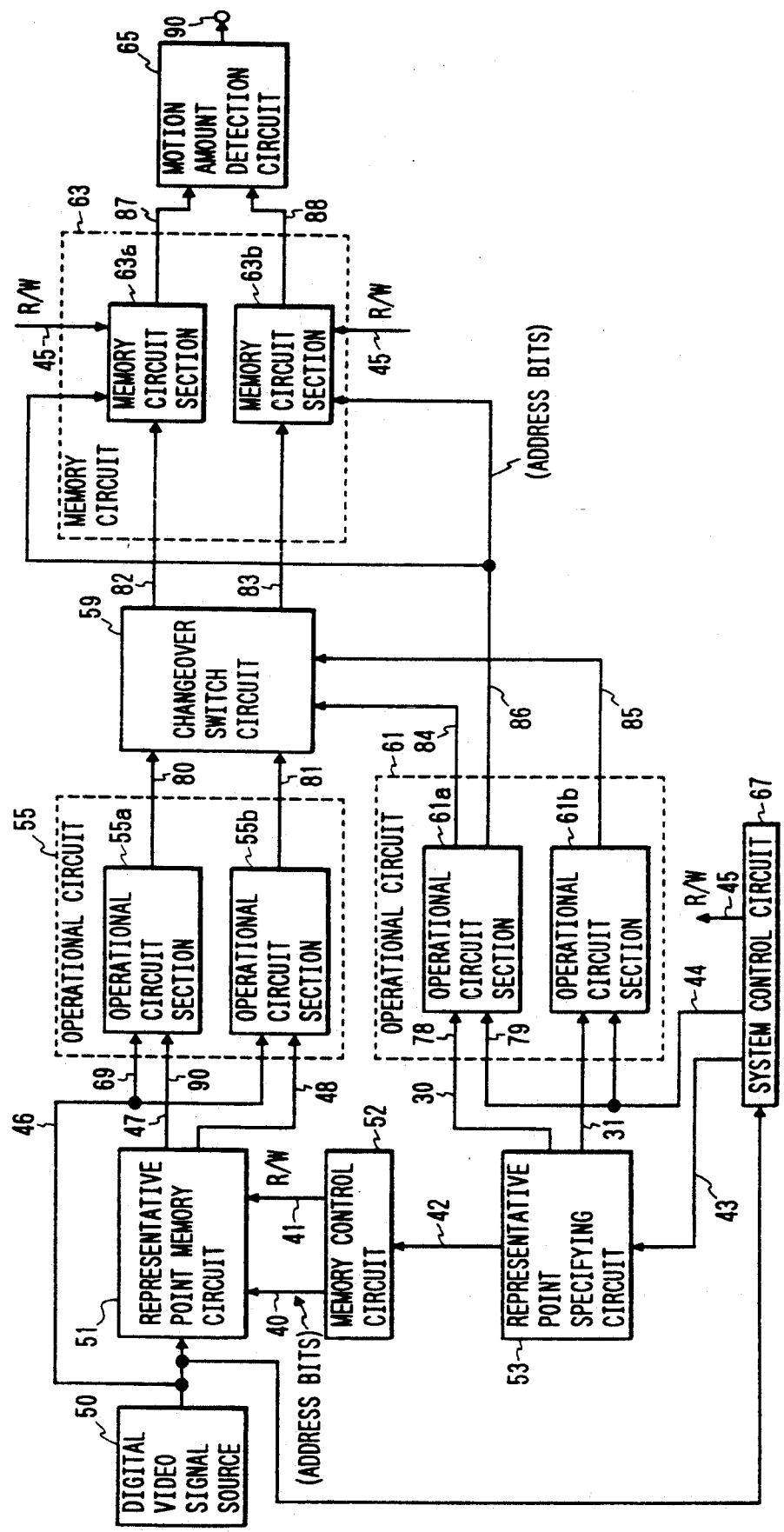
FIG. 4 is a block diagram of a first embodiment of a motion amount detection apparatus according to the present invention.

A first embodiment of a motion amount detection apparatus according to the present invention will be described referring to the block diagram of FIG. 4 and to FIG. 5, which illustrates the representative point positions and comparison intervals for this embodiment. In FIG. 4, 50 denotes a source of a digital video signal, such as a miniature type of video camera. That digital video signal is supplied to a representative point memory circuit 51 and to an operational circuit 55. The representative point memory circuit 51 is controlled by a memory control circuit 52, which supplies address bits 40 and a read/write control signal 41. The operation of the memory control circuit 52 is based on output signals 42 supplied from a representative point specifying circuit 53, which specify the positions within each field of the input digital video signal at which a set of representative points occur. Representative point position information is also supplied, as signals 30, 31, to an operational circuit 61 from the representative point specifying circuit 53 as described in detail hereinafter.

The operational circuit 55 functions to compare successive picture element values of the input digital video signal with representative point values (i.e. the values of picture elements respectively corresponding to the representative points) from the preceding field, during respective comparison intervals. The operational circuit 55 is formed of a first operational circuit section 55a and a second operational circuit section 55b, which operate in parallel. Output result values that are produced from these circuit sections 55a, 55b are transferred as signals 80, 81 to a changeover switch circuit 59.

The memory circuit 63 is formed of a first memory circuit section 63a and a second memory circuit section 63b, which receive sets of operational result values from the operational circuit sections operational circuit section 55a and operational circuit section 55b selectively transferred by the changeover switch circuit 59 as signals 82, 83. As for the prior art example described hereinabove, a motion amount detection circuit 65 periodically judges an amount of relative motion between two sequentially occurring fields, based on the position of an address within the memory circuit 63 having a minimum value of cumulative data left stored therein.

The operational circuit 61 derives respective relative position values corresponding to the operational result values produced by the operational circuit 55, and is formed of a first operational circuit section 61a and a second operational circuit section 61b, which operate based on the signals 30, 31 supplied from the representative point specifying circuit 53 and a signal 44 supplied from a system control circuit 67, which specifies successive position numbers of the picture elements of the input digital video signal. The system control circuit 67 generates various control signals 43, 44, 45, etc. for controlling the overall operation of the apparatus, based on horizontal and vertical synchronizing signals and a sample clock signal which are extracted from the input digital video signal.

Signals 84, 85 for controlling the operation of the changeover switch circuit 59 (i.e. to determine the one of the memory sections 63a, 63b to which each operational result value produced from circuit sections 55a, 55b is transferred) are derived by the operational circuit 61 as described hereinafter, together with an address signal 86 which determines each address within either of the memory circuit sections 63a, 63b into which operational result values are cumulatively stored.

Figure 5:
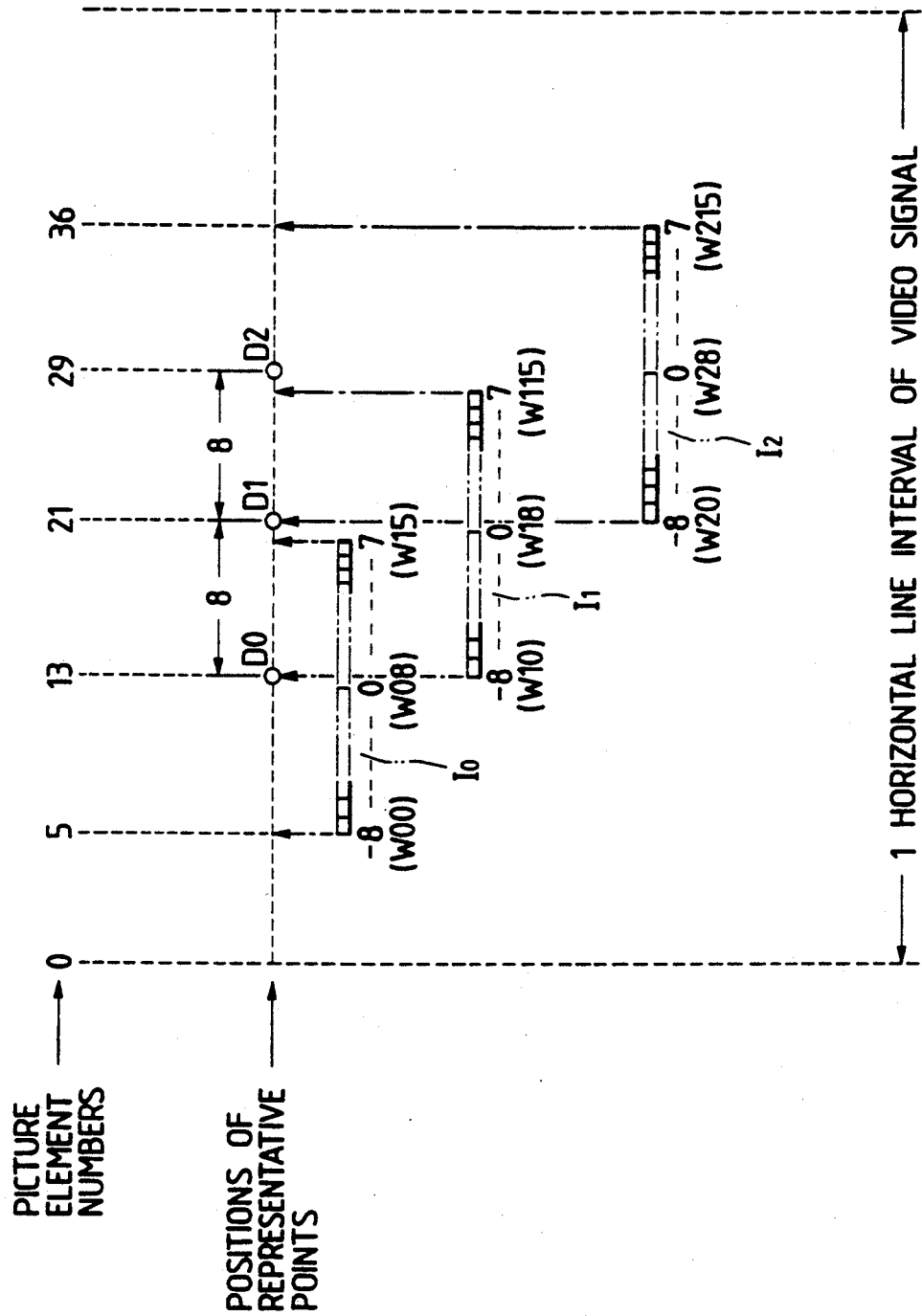
FIG. 5 is a diagram for illustrating comparison intervals of the apparatus of FIG. 4.

For simplicity of description, it will be assumed that this embodiment uses only three representative points as shown in FIG. 5, designated as D0, D1 and D2 respectively, which are disposed at equal spacings of 8 picture element positions within one horizontal line interval of each field of the digital video signal. As shown, each of the three comparison intervals I0, I1 and I2 which respectively correspond to D0, D1 and D2 extends over a range of 16 picture element positions. The respective values of relative distance with respect to D0 within the comparison interval I0 are designated as W00 to W15 (with position W08 being the representative point D0 position), with the position W00 having a relative distance of −8 from the representative point D0, and the position W15 having a relative distance value of +7. Similarly, the 16 positions within the comparison interval I1 are designated as W10 to W115, with W18 being the D1 representative point position, and the 16 positions within the comparison interval I1 are designated as W20 to W215, with W28 being the D1 representative point position. It is further assumed that the respective positions of the representative points D0, D1 and D2 along the horizontal line interval correspond to the picture element numbers 13, 21 and 29 within that line interval.

Figure 6:
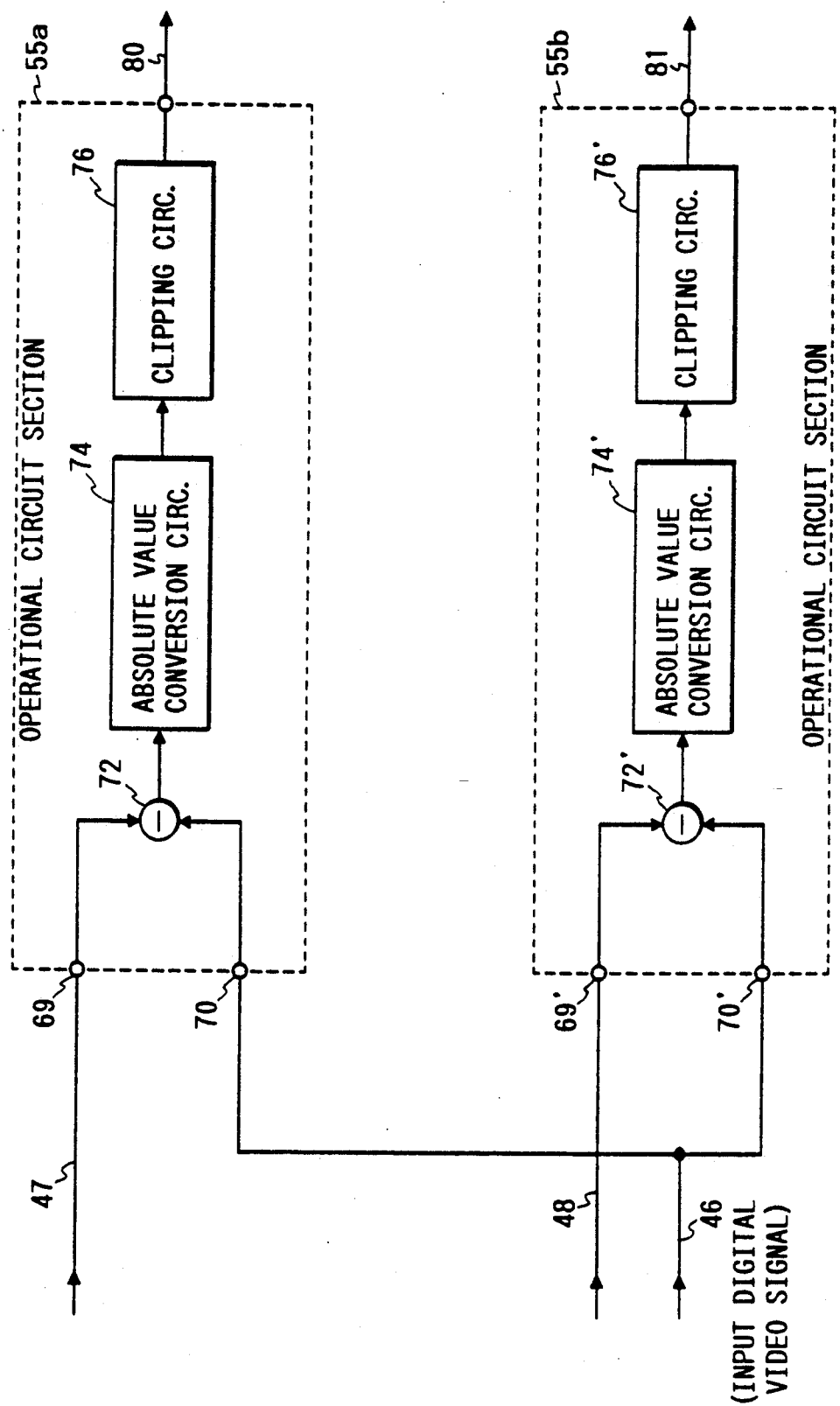
FIG. 6 is a circuit diagram showing the internal configuration of an operational circuit in the embodiment of FIG. 4, for deriving absolute difference values.

FIG. 6 shows the internal configuration of the operational circuit 55. The operational circuit section 55a is formed of a subtractor 72 for obtaining the difference between each of successive values of the input digital video signal (applied to input terminal 70) and representative point values from the preceding field (applied to input terminal 69, from the representative point memory circuit 51). The absolute value of each difference is obtained by an absolute value conversion circuit 74, and the result is clipped (by removal of high-order bits) by a clipping circuit 76. The operational circuit section 55a has an an identical configuration.

Figure 7:
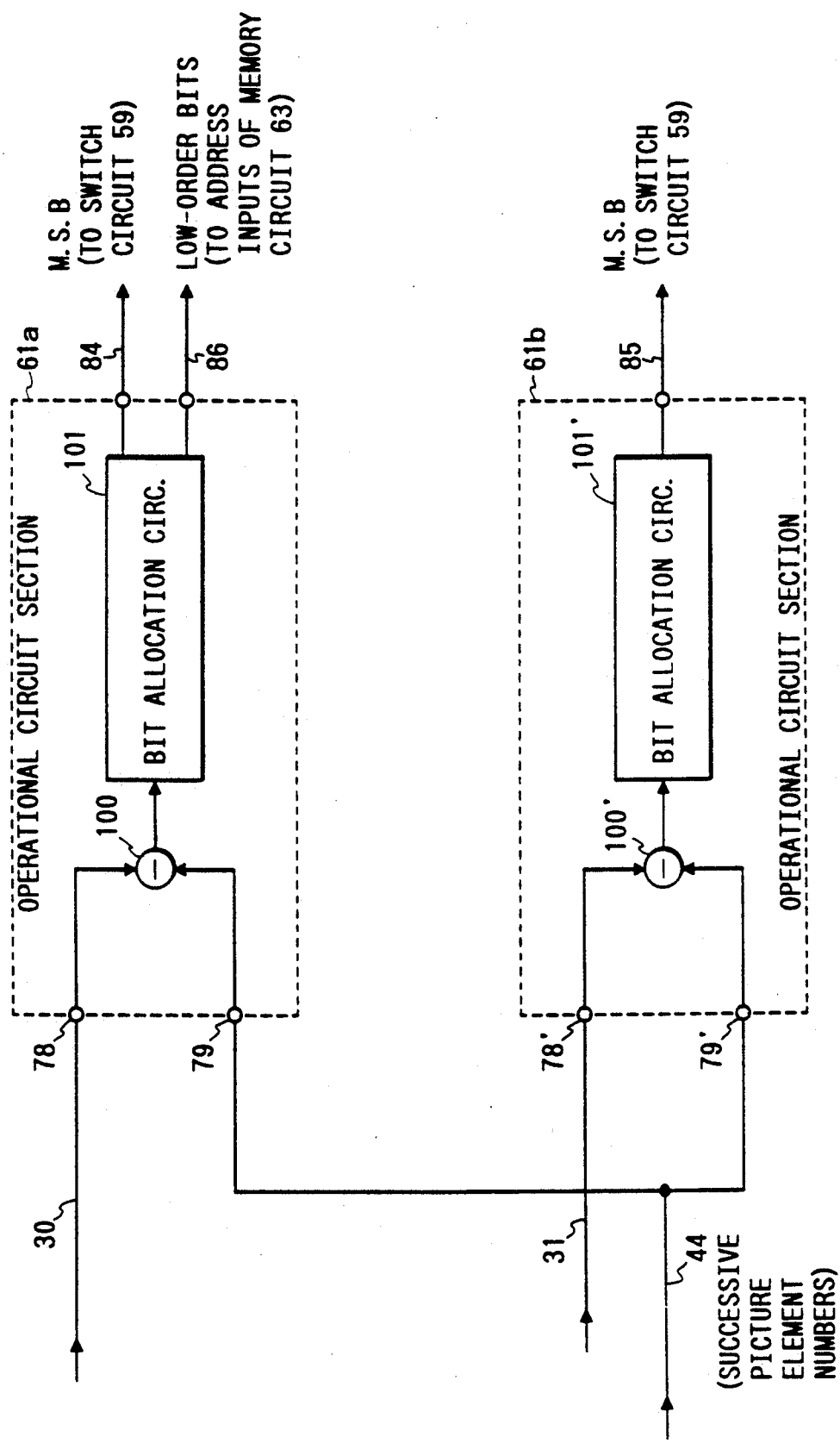
FIG. 7 is a circuit diagram showing the internal configuration of an operational circuit in the embodiment of FIG. 4, for deriving memory allocation data.

The internal configuration of the operational circuit 61 is shown in FIG. 7. As shown, the operational circuit section 61a is made up of a subtractor 100 for obtaining the difference between of successive position numbers of picture elements of the input digital video signal (sent to terminal 79 from the system control circuit 67) and position numbers of the representative points (supplied from the representative point specifying circuit 53), as described in detail hereinafter. The M.S.B. of each subtraction result is separated by a bit allocation circuit 101 and supplied as a selection control signal 84 to the changeover switch circuit 59. The remaining low-order bits of each subtraction result are supplied as the aforementioned address signal 86 for the memory circuit 63. The operational circuit section 61b has an identical configuration, however since the circuits operate such that the low-order bits of each result obtained from the operational circuit section 61a will be identical to those of any result that is obtained simultaneously from the operational circuit section 61b (as described hereinafter), it is only necessary to use the low-order bits from either the operational circuit section 61a or the operational circuit section 61b as an address signal from the memory circuit 63.

FIG. 9 is a diagram for illustrating the relationships between the data values which are supplied to the input terminals 69, 69' and 78, 78' of the operational circuit 55 and the operational circuit 61 respectively shown in FIGS. 6 and 7. The table of FIG. 10 shows the relative distance values between operational result values obtained for each of the comparison intervals I0, I1 and I2 and the respective representative points D0, D1, D2 of these intervals.

Figure 8A:
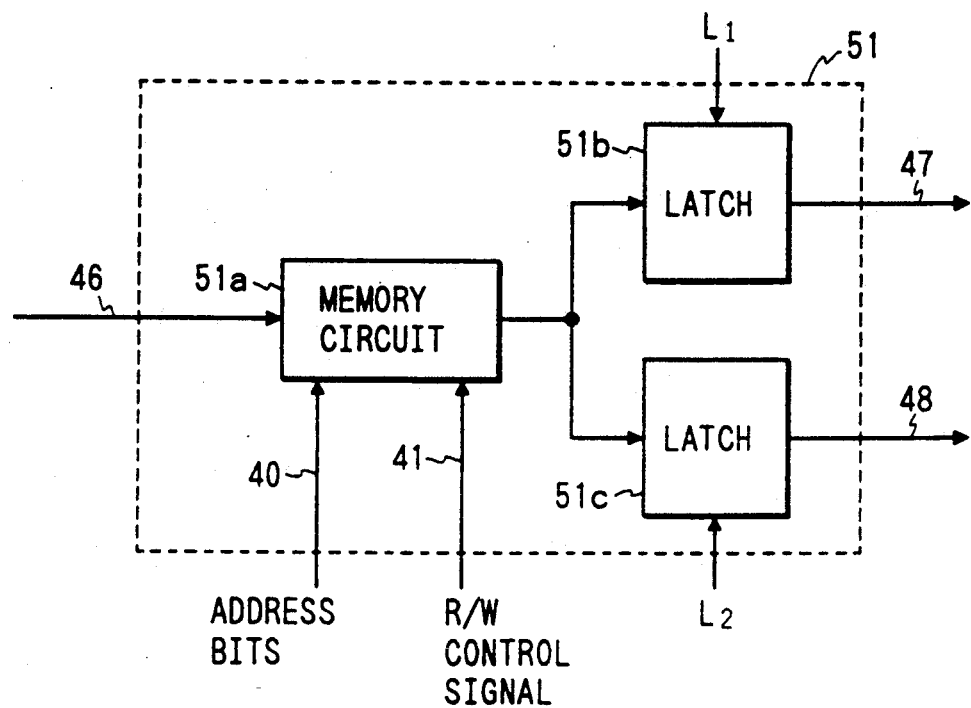
FIGS. 8a and 8B are circuit diagrams showing internal configurations of memory circuits of the embodiment of FIG. 4.

FIG. 8A shows an example of the internal configuration of the representative point memory circuit 51. Here, a memory circuit 51a is controlled by address and R/W signals supplied from the memory control circuit 52, and data values read out from the memory 51a are supplied to each of two latch circuits 51b, 51c which are respectively controlled by latch signals L1, L2 supplied from the memory control circuit 52. Thus for example when a representative point value from the preceding field is to be supplied to the operational circuit section 55a or the operational circuit section 55b, that representative point value is read out from the memory 51a at a appropriate point in the appropriate horizontal line interval of the current field (e.g. at the picture element number 5 in the case of comparison interval I0, for the representative point D0 as shown in FIG. 9) and is then set into the appropriate one of the latch circuits 51b, 51c, to be thereafter continuously supplied to the corresponding one of the operational circuit sections 55a, 55b during one comparison interval.

Figure 8B:
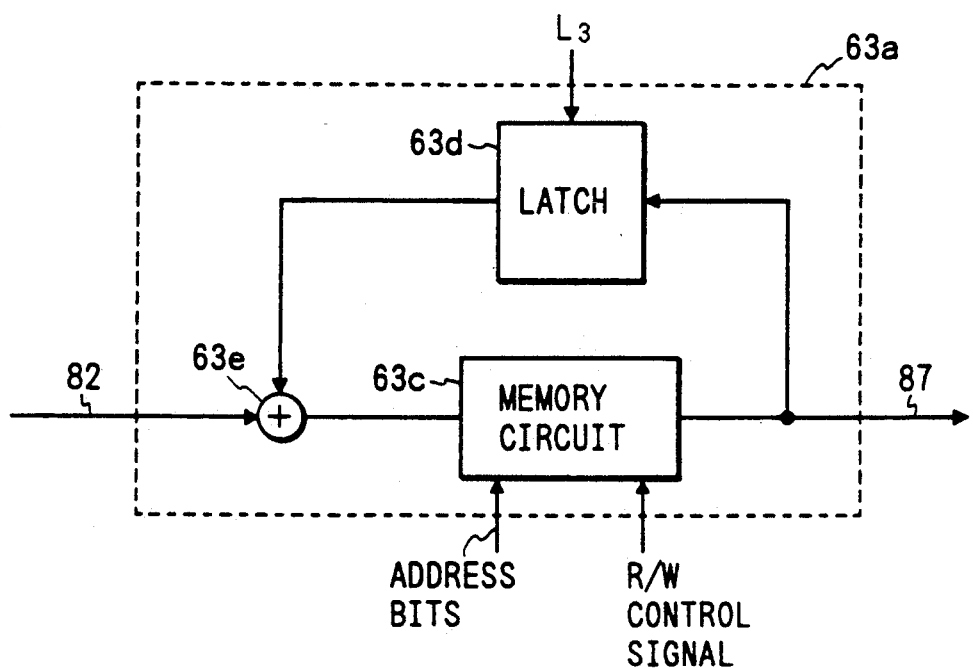

FIG. 8B shows an example of an internal configuration for each of the cumulative memory sections 63a, 63b of the memory circuit 63. When a cumulative storage operation is to be executed, the previous contents of an address are read out from a memory section 63c, and set into a latch circuit 63d controlled by a latch signal L3, to be added to an incoming operational result value by the adder 63e. The addition result is then stored back in the same address of the memory section 63c.

The overall operation of this embodiment is as follows. During each field of the input digital video signal, the representative point memory circuit 51 stores respectively picture element values for the representative points D0, D1 and D2, and outputs each of these during the respective comparison intervals I0, I1 and I2 in the succeeding field of the video signal. Thus as shown in FIG. 9, the value of representative point D0 from the previous field begins to be outputted from the representative point memory circuit 51 (to input terminal 69 of the operational circuit section 55a) in coincidence with picture element number 5 of the representative point horizontal line interval of the current field, and is continuously outputted until picture element number 20. Similarly, the previous field value of representative point D1 is supplied to the operational circuit section 55b (input terminal 69') from the 13$^{th}$ to the 28$^{th}$ picture element position of that horizontal line interval, and the the previous field value of representative point D2 is supplied to the operational circuit section 55a (input terminal 69) from the 21$^{st}$ to the 36$^{th}$ picture element position of that horizontal line interval. Successive operational result values within each of the comparison intervals I0, I1 and I2 are thereby obtained from the operational circuit 55.

In synchronism with these operations, respective values of relative distance (with respect to a representative point) within each of the comparison intervals I0, I1 and I2 are generated by the operational circuit 61 in correspondence with each operational result value that is generated by the operational circuit 55. To achieve this, as illustrated in FIG. 9, the position of the representative point D0 (i.e. 13) is fixedly supplied from the representative point specifying circuit 53 to the input terminal 78 of the operational circuit section 61a from the 5$^{th}$ to the 20$^{th}$ picture element position of the representative point horizontal line interval, while the position of the representative point D1 (i.e. 21) is similarly supplied to the input terminal 78' of the operational circuit section 61b from the 13$^{th}$ to the 28$^{th}$ picture element position of that horizontal line interval, and the position of the representative point D2 (i.e. 29) is similarly supplied to the input terminal 788 of the operational circuit section 61a from the 29$^{th}$ to the 36$^{th}$ picture element position of that horizontal line interval.

These relative distance values are illustrated in the tables of FIGS. 10A and 10B. For example, at the 5$^{th}$ picture element of the representative point scan line in the current field, at the position W00 having a relative distance of $-8$ from D0, the subtractor 100 of the operational circuit section 61a shown in FIG. 7 produces the binary value 1000. The MSB of that value (i.e. a "1" state bit) is applied as control signal 84 to the changeover switch circuit 59 of FIG. 4. As a result, the operational result value that is generated by the operational circuit section 55a for position W00 is transferred to the memory circuit section 63a. In addition, the remaining low-order bits 000 of the binary value 1000 are supplied as the address signal 86 to the memory circuit 63, so that the operational result value for position W00 is stored in address 000 of the memory circuit section 63a. Subsequently, at the 13$^{th}$ picture element position in that line interval, since a "1" state output is generated as control signal 85 from the operational circuit section 61b and 000 is again produced as the address signal bits 86, the operational result value for the position W10 within the I1 comparison interval, produced from the operational circuit section 55b, is cumulatively stored in the address 000 of the memory circuit section 63a (i.e. the previously stored value obtained for W00 is read out, added to the value obtained for W10, and the result stored back in the address 000 of the memory circuit section 63a). Similarly, at the 21st picture element timing, the operational result value generated by the operational circuit section 55a for the position W20 in the comparison interval I2 is cumulatively stored in that address 000 of the memory circuit section 63a.

Figures 11, 13:
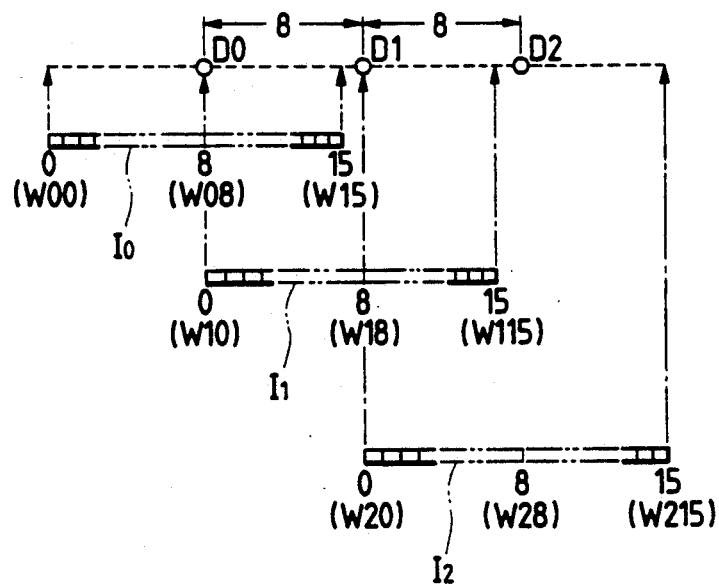
FIG. 11 is a table showing the allocation of operational result values to respective memory addresses of the memory circuit sections, in the embodiment of FIG. 4.
FIG. 13 is a diagram for illustrating comparison ranges for respective representative points, in the apparatus of FIG. 12.

It can thus be understood that the apparatus will cumulatively stored in respective addresses (8 addresses in each of the memory sections 63a and 63b), each of the three operational result values that are obtained for each of the 16 comparison interval positions. The allocation of cumulatively stored result values (designated by their respectively corresponding positions W00, W01 etc. in the comparison intervals) the 16 addresses of the memory circuit 63 is illustrated in FIG. 11, in which the 8 memory addresses in each of the memory sections 63a, 63b are numbered from 0 to 7. Hence, the memory control operations required for such a motion amount detection apparatus are extremely simple. If the relative distance value corresponding to an operational result value is negative (so that the MSB of that distance, expressed as a binary number, is 1), then that operational result value is cumulatively written into an address of the memory circuit section 63a which is specified by the remaining low-order bits of that binary relative distance value. If the relative distance value is positive or zero (so that the MSB is 0), then the operational result value is cumulatively written into an address of the memory circuit section 63b which is specified by the low-order bits of the relative distance value. As successive operational result values are derived within each of the comparison intervals I0, I1, I2, the address values to which these results are assigned will successively increase in a continuous manner.

Moreover, when two operational result values are obtained in parallel for two different comparison intervals, these will written into identically numbered memory addresses, with one address being in the memory circuit section 63a and the other being in the memory circuit section 63b.

At some point after cumulative storage has been executed for all of the representative points of the current field, the motion amount detection circuit 65 detects the one of the addresses in the memory circuit 63 which contains the smallest of all of the cumulative result values, and thereby determines the direction and amount of any relative picture motion (in the horizontal direction) between successive fields. If for example the smallest value is left stored in the address 0 of the memory circuit section 63a, then this indicates that the amount of motion was zero.

Figure 1:
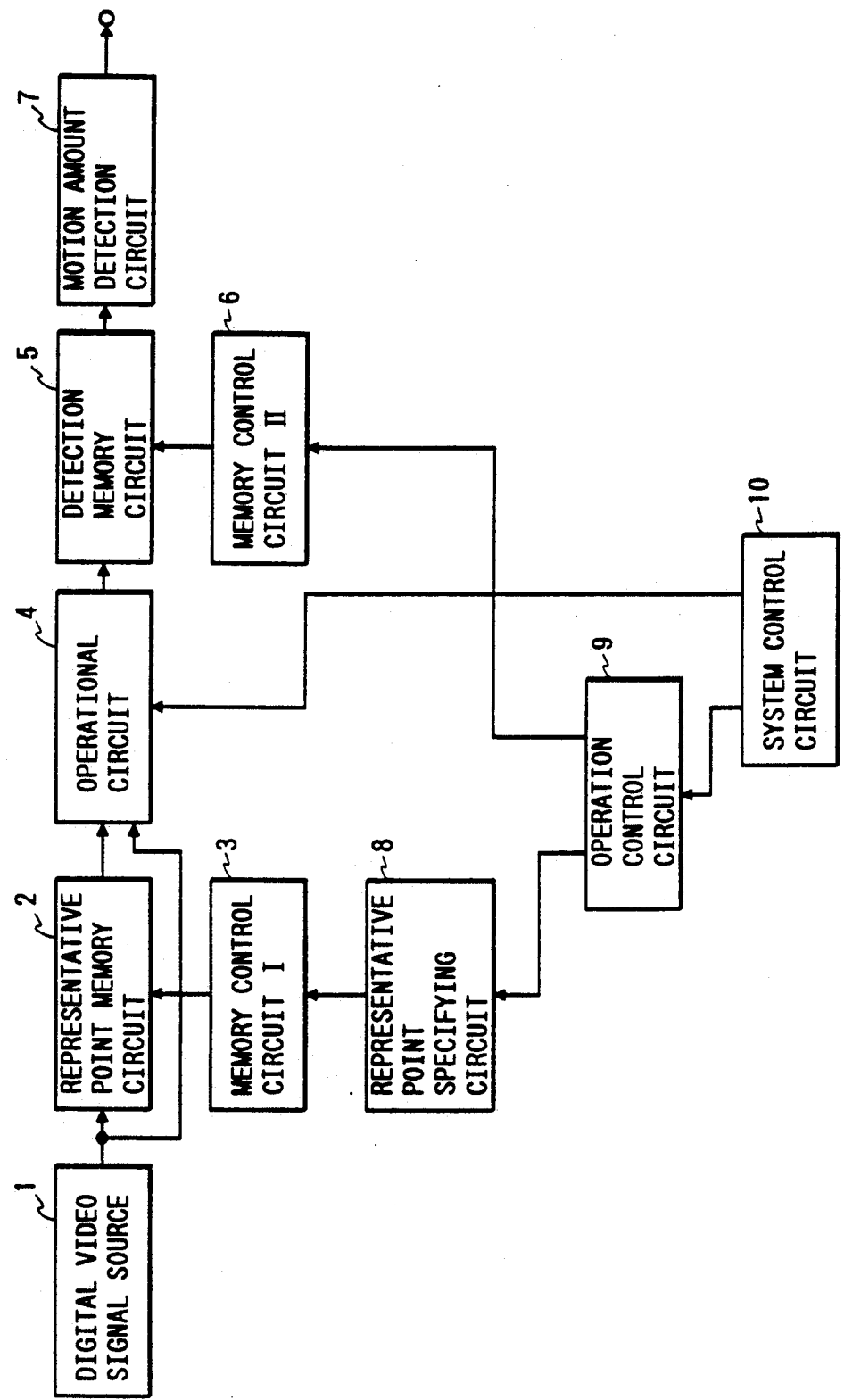
FIG. 1 is a block diagram of a prior art example of a motion amount detection apparatus.
Figure 2:
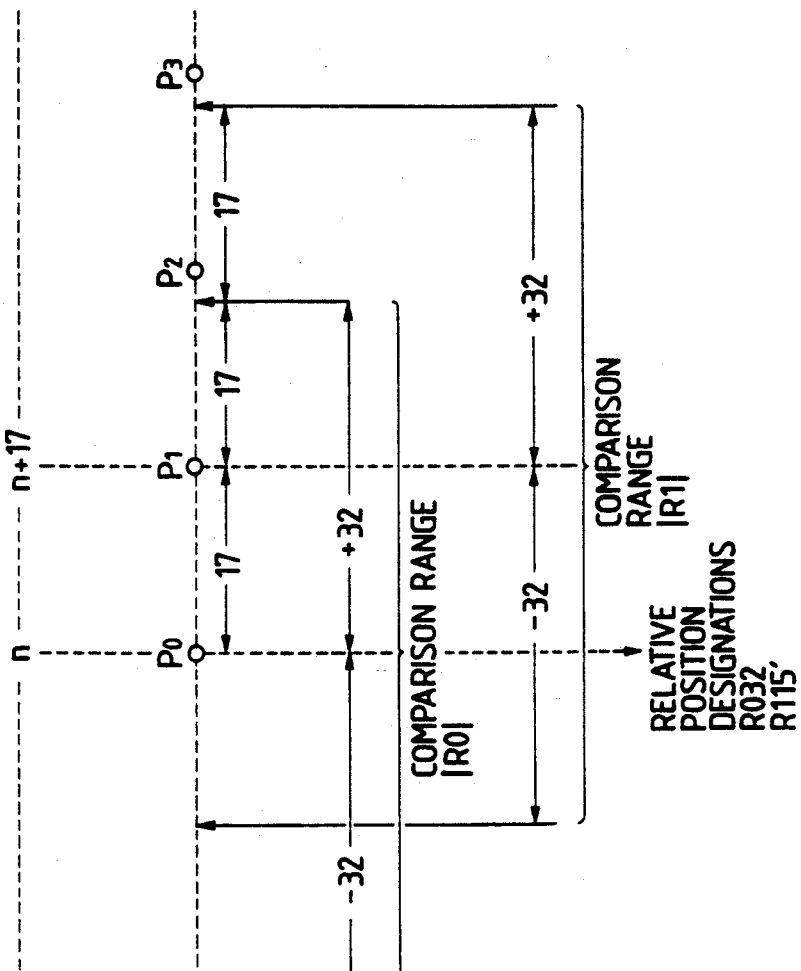
FIG. 2 is a diagram for illustrating comparison intervals of representative points of the apparatus of FIG. 1.

It can thus be understood that the above embodiment completely overcomes the problems of difficulty of address control for the memory circuit which is used for motion amount detection purposes, which arise with the prior art apparatus of FIG. 1 as described hereinabove.

It is of course also necessary to provide means for resetting the contents of all of the addresses of the memory circuit 63 to zero at some point prior to the start of a new cumulative storage operation, however for brevity of description the means for executing this have been omitted from the above.

The above embodiment has been described for the case in which only three representative points are utilized. However it will be apparent that a greater number of representative points could be utilized, with no alteration in the basic operation described above, and with only minor changes such as an increase in the numbers of addresses available in the memory circuit 63 being required. Furthermore although the embodiment has been described for the case of 1-dimensional motion amount detection, in general such an apparatus is applicable to motion vector detection. In that case, representative points would be assigned at regular spacings in the vertical direction as well as in the horizontal direction, within each field. Other than measuring distances in the vertical direction in units of horizontal line intervals rather than in units of picture elements (i.e. digital sample values), motion amount detection in the vertical direction would be identical to that described above for the horizontal direction.

Moreover, although the embodiment has been described for the case in which only two memory circuit sections 63a, 63b are utilized for the detection memory circuit, if a larger number of representative points were to be utilized along the horizontal direction, with relatively smaller sizes for the comparison intervals, then it might be preferable to divide the memory circuit 63 into a larger number of memory sections. In that case, a plurality of high-order bits of each relative distance value (including the MSB) would be utilized to determine the specific memory section to which each operational result value is to be assigned. For example if the memory circuit 63 were divided into four memory sections, then the MSB and the next-lower bit of each relative distance value would be supplied to the changeover switch circuit 59, which would be configured to respond to each of the four possible combinations of states of these bits by determining a corresponding memory section allocation for each operational result value. As for the embodiment described above, the address to which each operational result value is cumulatively stored would be determined by the remaining low-order bits of the corresponding relative distance value. It is clear that in such a case, the advantages of ease of memory circuit control described hereinabove for the first embodiment would be retained.

A second embodiment of a motion amount detection apparatus according to the present invention will be described referring to FIG. 12. This embodiment differs from the first embodiment described hereinabove only with respect to the method of deriving control signals for controlling the changeover switch circuit 59 to allocate respective operational result values to the memory sections 63a, 63b, so that only the points of difference between this embodiment and the first embodiment will be described. In the first embodiment described above, relative distance values within each comparison interval are obtained as negative or positive numbers, so that the MSB of each relative distance value expressed as a binary number can be used in selecting the memory section to which the corresponding operational result value is allocated. With the second embodiment of FIG. 12 however, the relative distance values within each comparison interval are obtained as only positive numbers, in the range 0 to 15, as illustrated in the diagram for FIG. 13 which shows the respectively comparison intervals I0, I1, I2 for the three representative points D0, D1, D2 of this embodiment, and the table of FIG. 13. As shown in FIG. 12, the outputs 84, 85 from the operational circuit sections 61a, 61b are supplied to respective divider circuits 91, 92, in which each relative distance value supplied thereto is divided by a fixed integer. In this embodiment, the fixed integer is 8. Only the bit which appears immediately to the left of the decimal point position, in the remainder resulting from a division operation by each divider circuit 91 or 92, is outputted. As a result, as shown in FIGS. 14A and 14B, for each relative distance value in the range 0 to 7, the corresponding output bit produced from a divider will be 0. For each relative distance value in the range 8 to 15, the corresponding output bit produced from a divider will be 1.

Although the above description has assumed that dividers are used, it will be apparent that if each relative position value is expressed as a five-bit binary number, then it is actually only necessary to extract the MSB of that number, to obtain the respective "division result bits" which are shown in the tables of FIGS. 14A and 14B.

It can thus be understood that the changeover switch circuit 59 of this embodiment can be controlled by the output bit signals produced from the dividers 91, 92 of this embodiment in the same way in which the changeover switch circuit 59 of the first embodiment is controlled in accordance with the MSB bits states of relative distance values. That is to say, depending upon the division bit state obtained for the relative distance value corresponding to each operational result value, that operational result value will be cumulative stored in address of either the 63a or the 63b.

As for the first embodiment, the address in which each operational result value is stored is determined by the three low-order bits (extending from the LSB) of the corresponding relative distance value. It will be clear that, as for the first embodiment, the address values which are assigned for the memory circuit 63 increase in a continuously successive manner for successively adjacent picture elements of the representative point horizontal line interval, and that when two relative distance values are generated in parallel within two different comparison intervals, the two result values obtained will be assigned to the same address in respective ones of the two memory sections 63a, 63b. Thus the advantages of simplicity of memory control provided by the first embodiment are also provided by the second embodiment of the invention.

Figure 15:
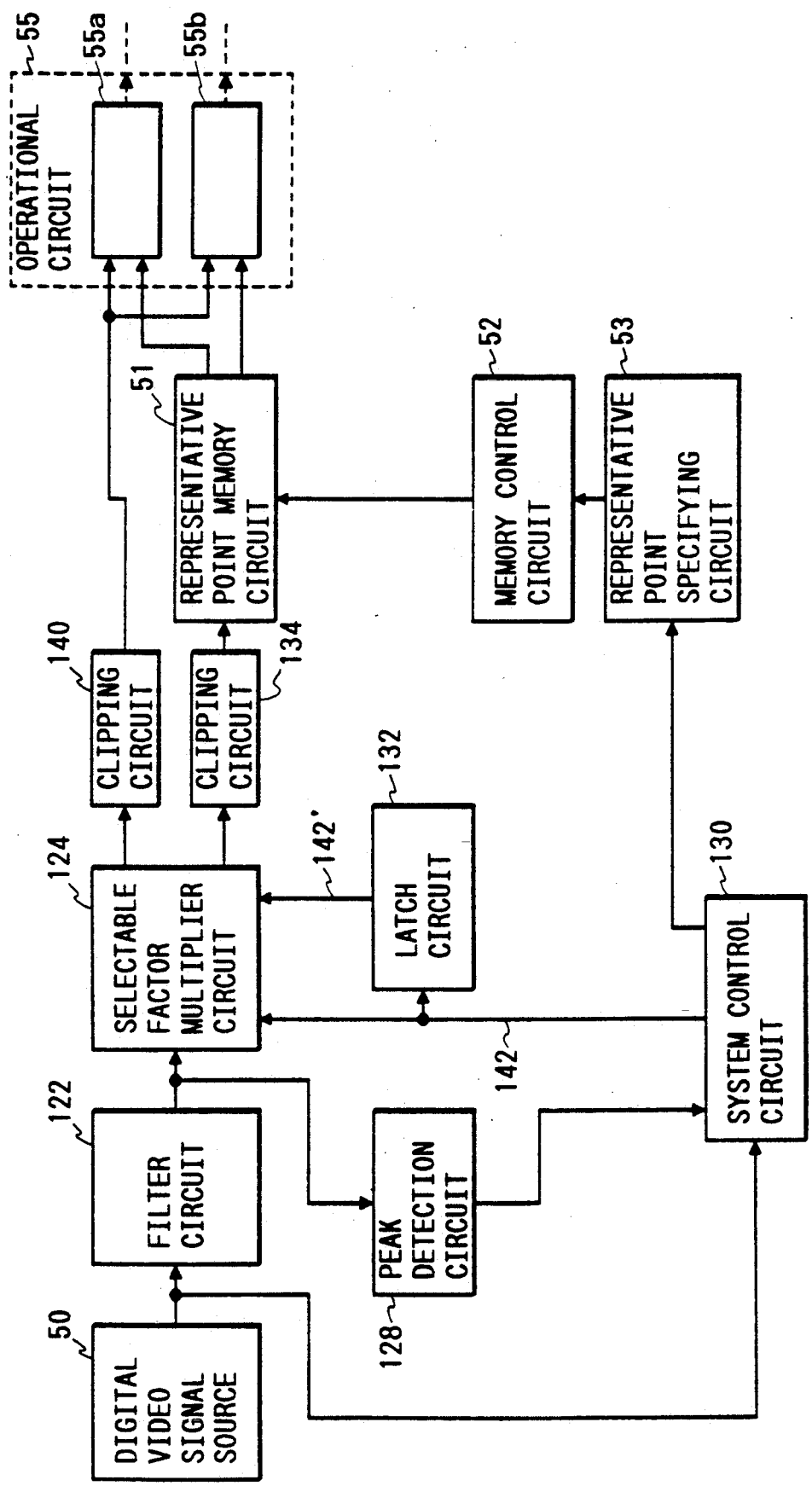
FIG. 15 is a partial block diagram of a third embodiment of a motion amount detection apparatus according to the present invention, showing a signal level control circuit.

A third embodiment of a motion amount detection apparatus according to the present invention will be described referring to the partial block diagram of FIG. 15. This embodiment can be considered as being a modification of the first embodiment of FIG. 4 or the second embodiment of FIG. 12, but with the addition of a signal level control circuit inserted between the digital video signal source 50 and the representative point memory circuit 51, operational circuit 55, for controlling the signal level of the representative point values obtained from the input digital video signal. The signal level control circuit is formed of a filter circuit 122, a peak detection circuit 128, a selectable factor multiplier circuit 124 and latch circuit 132, and first and second clipping circuits 134, 140. Control signals for controlling the overall operation of the motion amount detection apparatus are supplied from a system control circuit 130, which has the functions of the system control circuit 67 of the embodiment of FIG. 4 described hereinabove, while generating further signals which are required by the signal level control circuit, as described hereinafter.

The operation is as follows. The input digital video signal which will be assumed to be an 8-bit signal, i.e. consisting of successive 8-bit digital sample (picture element) values, is transferred through a high-pass filter circuit 122, and the result converted to a 10-bit signal.

That is to say, two 0 state bits are inserted above the MSB in the case of each positive sample value, while two 1 state bits are inserted above the MSB in the case of each negative value (assuming that two's complement binary representation is used, with the MSB serving as the sign bit). The output signal thus obtained from the filter circuit 122 is supplied to the peak detection circuit 128 and also to the selectable factor multiplier circuit 124. Peak values of that signal are detected by the peak detection circuit 128, and the detection results supplied to the system control circuit 130. Based on the detection results, the system control circuit 130 generates a signal for specifying a value of multiplication factor by which the 124 is to multiply the filtered video signal that is currently being supplied thereto from the filter circuit 122. More specifically, during the the first part of the current field of the digital video signal (preceding the first representative point position in the field) a peak signal level value that is detected by the peak detection circuit 128 during that part of the field is supplied to the system control circuit 130. In response, the system control circuit 130 produces a multiplication factor selection control value 142 which specifies a value of multiplication factor which the selectable factor multiplier circuit 124 will apply to the filtered input video signal applied thereto, during the remainder of the current field. In addition, the multiplication factor selection control value 142 that is generated by the system control circuit 130 in the current field is set into the latch circuit 132, while the latch circuit 132 outputs (during the current field) the multiplication factor selection control value that was inputted thereto in the preceding field, designated as 142'.

The filtered digital video signal, after being multiplied by the multiplication factor that is determined by the multiplication factor selection control value of the current field, is outputted through the clipping circuit 134 to the representative point memory circuit 51. In addition the filtered digital video signal, after being multiplied by the multiplication factor that is determined by the multiplication factor selection control value of the preceding field, is outputted through the clipping circuit 134 to the operational circuit 55, to be supplied to each of the circuit sections 55a, 55b. The subsequent operations of the apparatus executed by the circuit blocks following the operational circuit 55 are identical to those described hereinabove for the first or second embodiments, so that description of these operations will be omitted.

Figure 16:
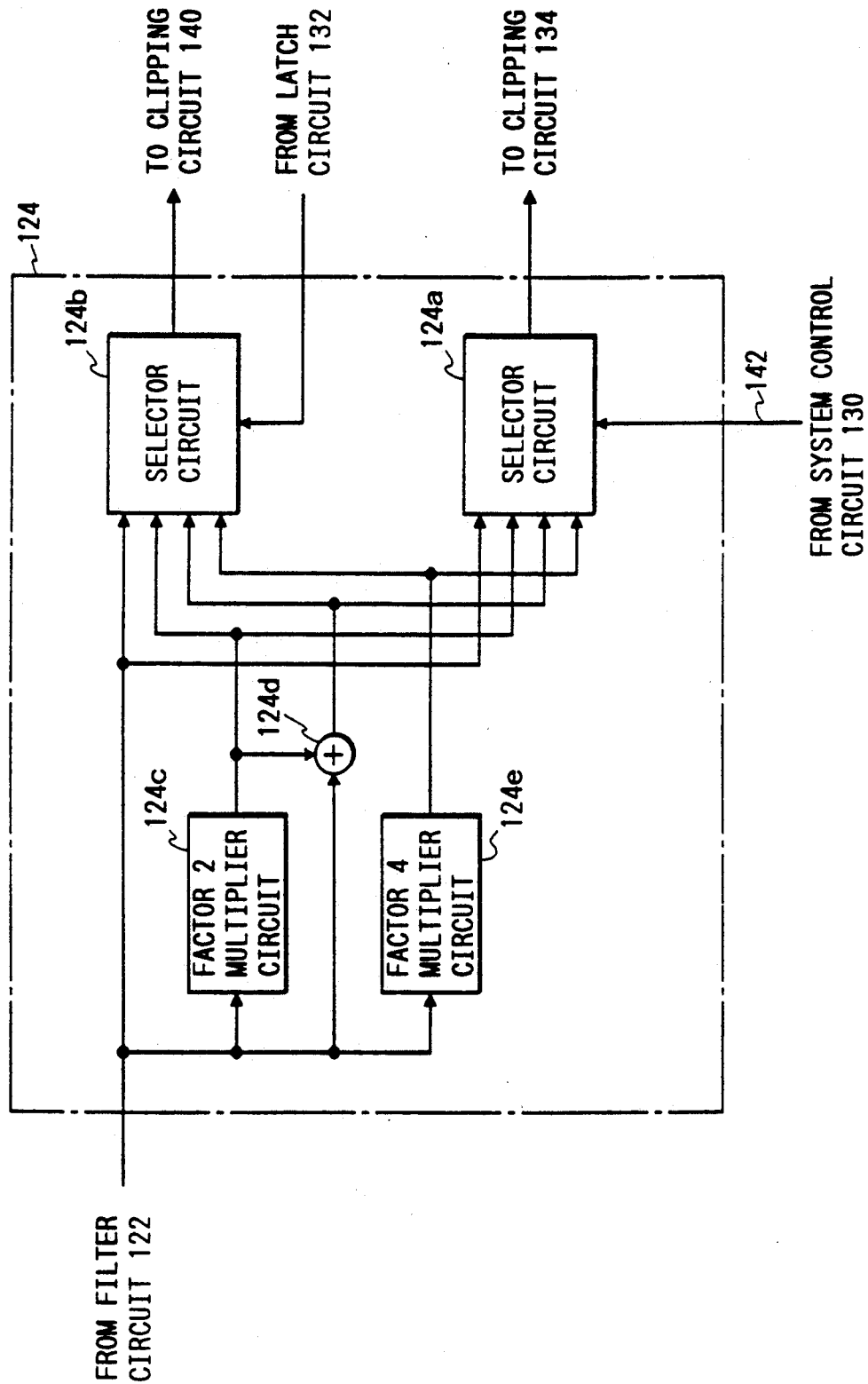
FIG. 16 is a circuit diagram showing a first example of the internal configuration of a selectable factor multiplier circuit in the embodiment of FIG. 15.

FIG. 16 is a circuit diagram showing the internal configuration of a first example of the selectable factor multiplier circuit 124 of this embodiment. This is made up of a factor 2 multiplier circuit 124c, a factor 4 multiplier circuit 124e, an adder 124d, a first selector circuit 124a and a second selector circuit 124b. Each of the selector circuits 124a and 124b has four inputs. In the case of the selector circuit 124a, one of these inputs is selected in accordance with the state of the selection control value 142 for the current field, supplied from the system control circuit 130. In the case of the selector circuit 124b, one of the four inputs is selected in accordance with the state of the selection control value 142' for the current field, supplied from the latch circuit 132. The filtered video signal from the filter circuit 122 is transferred directly to each of a first input of each of the selector circuits 124a, 124b, is transferred after being multiplied by the factor 2 to a second input of each of these selector circuits, is transferred after being (effectively) multiplied by 3 (from the adder 124d) to a third input of each selector circuit, and is transferred after being multiplied by the factor 4 to a fourth input of each selector circuit.

For example, the selectable factor multiplier circuit 124 can be configured such that each of the circuits 124a, 124b responds to a selection value (142 or 142') indicating a peak signal level that is in the range 50% to 100% of the maximum video signal level, by selecting the video signal that has been multiplied by the factor 1, while if the peak level is in the range 33% to 50% of the maximum video signal level the multiplication factor 2 is selected, if the peak level is in the range 25% to 33% of the maximum video signal level the multiplication factor 3 is selected, and if the peak level is less than 25% of the maximum video signal level the multiplication factor 4 is selected. However these ranges are given only by way of example.

The two lowest-significance bits of the 10-bit output signals produced from the selector circuits 124a and 124b are removed, and the resultant 8-bit signals transferred to the clipping circuits 134, 140 respectively. If the Video signal amplitude has been detected as being in the range for which a multiplication factor of 1 is applied, then this bit removal operation will result in an elimination of information-containing low-significance bits. However since these low-order bits contain substantial amounts of noise components, and the high-order bits that are outputted from the selector circuit 124a or 124b will contain a sufficient amount of information, since the video signal level is high, the elimination of these bits does not have a significant effect. If on the other hand the video signal amplitude has been detected as being in the range for which a multiplication factor of 4 is applied by the circuit 124, then of course the elimination of the two low-order bits of each result obtained from such a multiplication operation will not result in any elimination of information, i.e. the two low-order bits of the output signal from the selector circuit 124a or 124b will contain no actual information from the original video signal. Hence, the removal of the two low-order bits from that output signal of the selector circuit 124a or 124b will have no adverse effect.

Figure 18A:
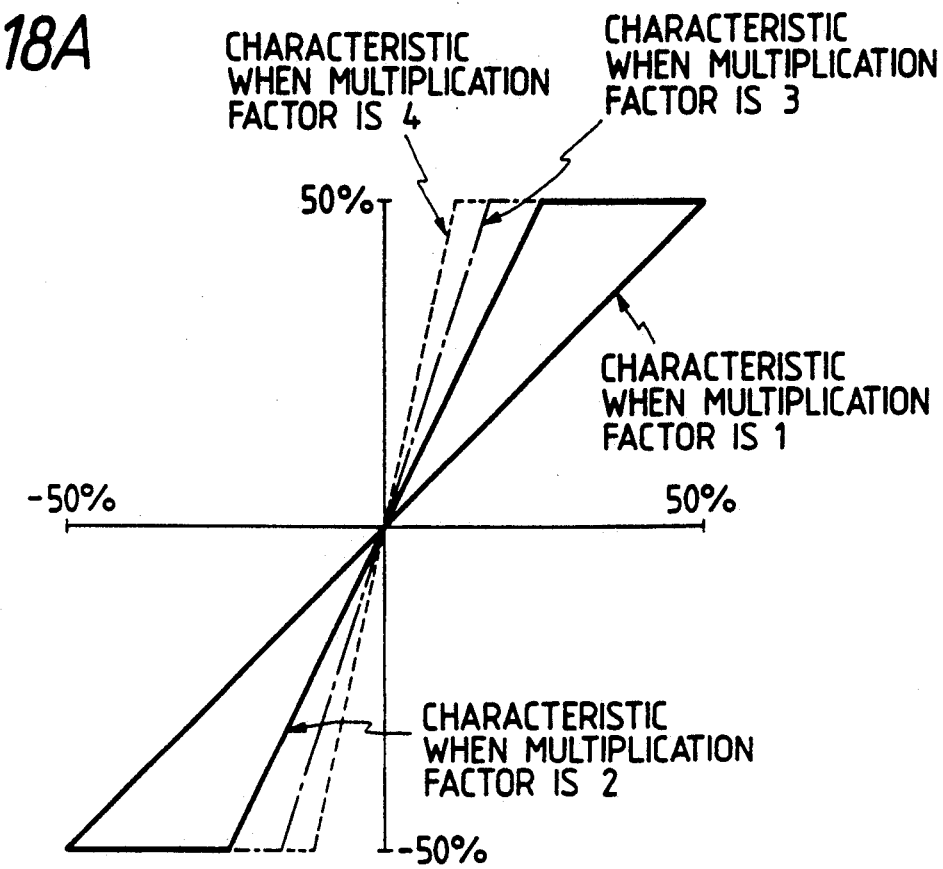
FIGS. 18A, 18B show examples of input/output characteristics for signal level control, obtainable with the embodiment of FIG. 15.

The clipping circuits 132, 140 function to limit the absolute value of each input signal applied thereto. FIG. 18A shows an example of the respective input/output characteristics obtained for the outputs from each of the each of the clipping circuits 134, 140 with respect to the input signal level supplied to the selectable factor multiplier circuit 124, in accordance with each of the multiplication factors which can be selected. FIG. 18A assumes that the clipping operation serves to limit the maximum output signal level from each clipping circuit to 50% of the maximum input signal level. As a result of that clipping operation, the respective output signals from the clipping circuits 134, 140 can each be expressed by a smaller number of bits than is necessary to express the corresponding output signals from the selector circuits 124a and 124b. Hence, the circuit scale of the various sections of the apparatus subsequent to the clipping circuits 134, 140, such as the operational circuit 55, representative point memory circuit 51 etc., can be made substantially smaller than would be required if each data value were expressed by the same number of bits as in the input digital video signal supplied from the digital video signal source 50. However, as a result of the signal level control that is provided by the selectable factor multiplier circuit 124 and the clipping circuits 134, 140, there is a much less possibility of errors occurring due to the effects of overflow upon the output values produced from the clipping circuits 134, 140, by comparison with a simple prior art method whereby only removal of high-order bits from the input digital video signal is executed.

The elimination of the two low-order bits from each of the output signals from the selector circuits 124a, 124b can be achieved simply by omitting connections to the corresponding output terminals of these selector circuit.

In addition, each of the factor multiplier circuits 124c, 124e shown in FIG. 16 can be implemented by executing appropriate bit-shifting operations, as is well known in the art, so that actual multiplication operations are not necessary.

With the above embodiment, the output signal from the clipping circuit 134 (i.e. consisting of clipped video signal values that have been multiplied by a multiplication factor determined based on detection of peak signal values in the current field of the input digital video signal) is supplied to the representative point memory circuit 51, for storing therein the representative point values for the current field, to be outputted during the succeeding field as described hereinabove for the first embodiment of FIG. 4. The output signal from the clipping circuit 140 ((i.e. consisting of clipped video signal values that have been multiplied by a multiplication factor determined based on detection of peak signal values in the preceding field of the input digital video signal) is supplied to respective inputs of the operational circuit 55, to be compared with the representative point values from the preceding field. Thus, each pair of values that are inputted together to the operational circuit section 55a or to the operational circuit section 55b will have been processed identically by the selectable factor multiplier circuit 124, so that no error in the comparison operations executed by the operational circuit 55 will occur as a result of the multiplication operations of the circuit 124.

Figure 18B:
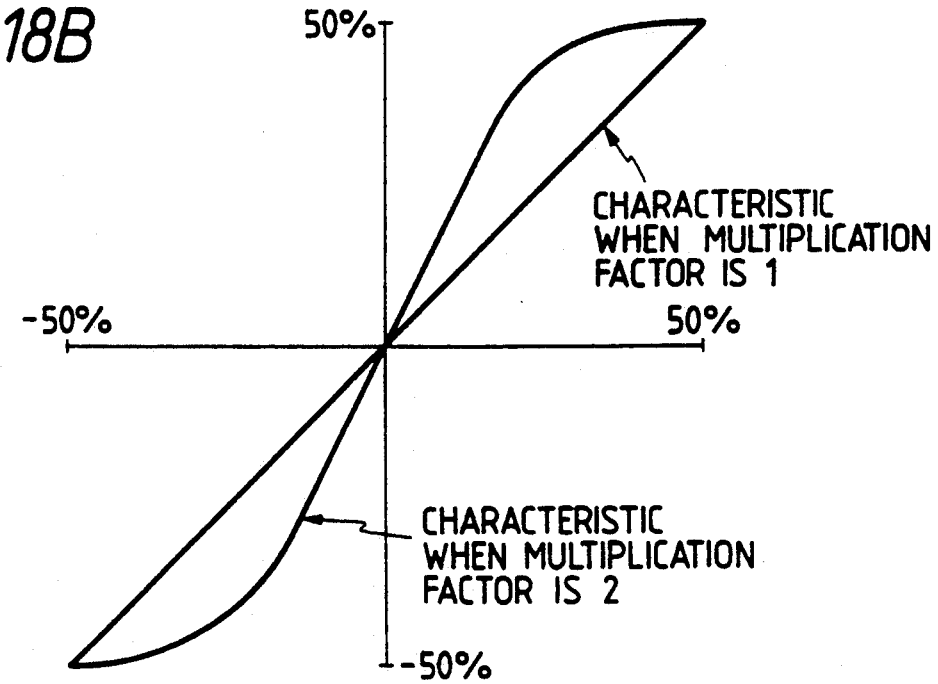

Alternatively, it would be possible to configure the selectable factor multiplier circuit 124 such as to provide multiplication factors which varies non-linearly. An example of resultant input/output characteristics is shown in FIG. 18B, with only the characteristics for two multiplication factors (i.e. 1 and 2) being shown. In this case, the characteristic for the multiplication factor 2 varies non-linearly in such a manner that clipping of the output signals from the selectable factor multiplier circuit 124 is unnecessary, i.e. the clipping circuits 132, 140 can be omitted in such a case, so that the circuit scale can be reduced.

Figure 17:
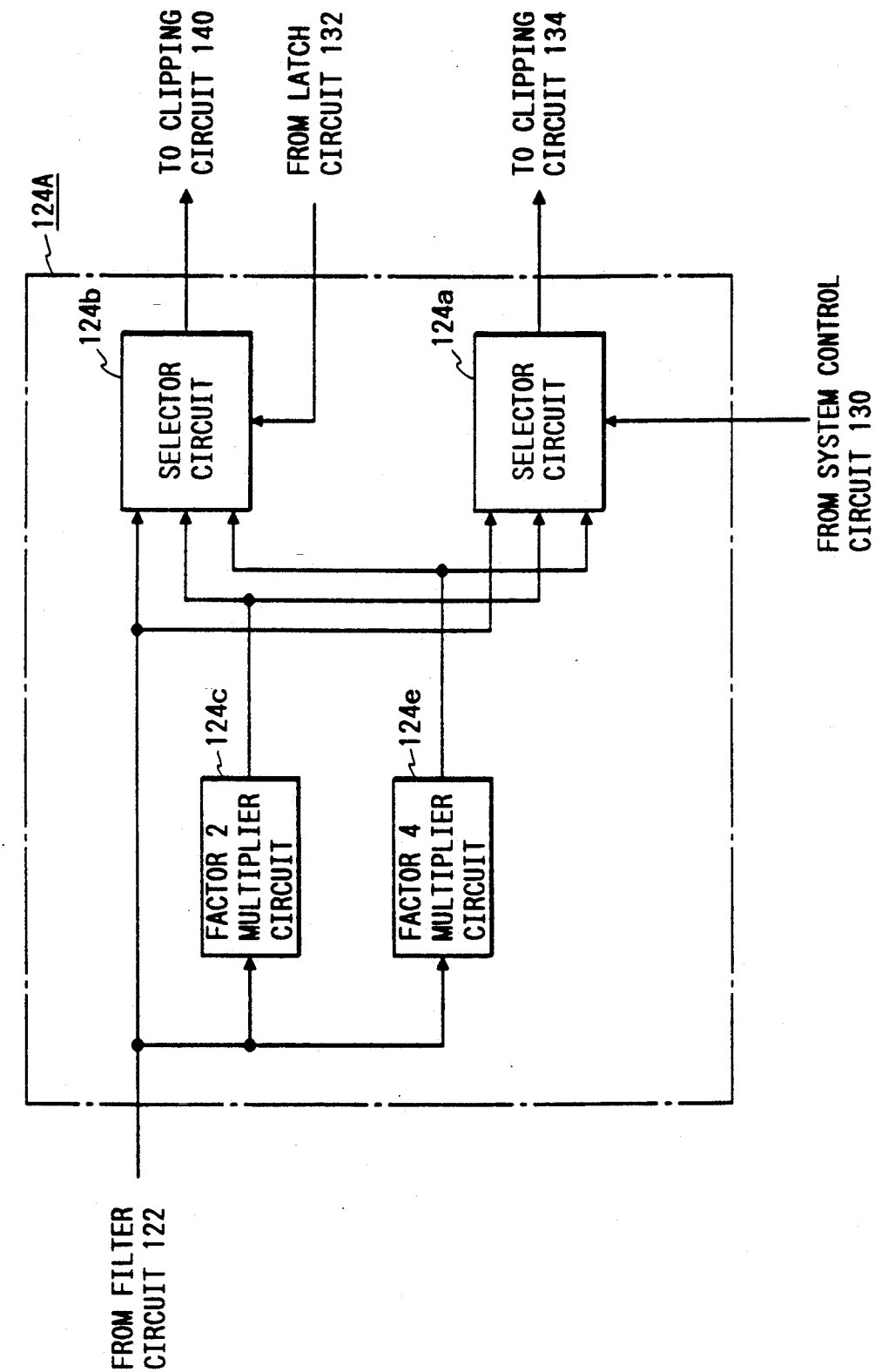
FIG. 17 is a circuit diagram showing a second example of the internal configuration of a selectable factor multiplier circuit in the embodiment of FIG. 15.

It would also be possible to use a smaller number of multiplication factors than those of the circuit of FIG. 16. FIG. 17 shows an example in which a selectable factor multiplier circuit 124A is utilized, which enables only the multiplication factors 1, 2 and 4 to be selected. In that case, the adder 124d of FIG. 16 can be omitted, to reduce the necessary circuit scale.

Figure 19:
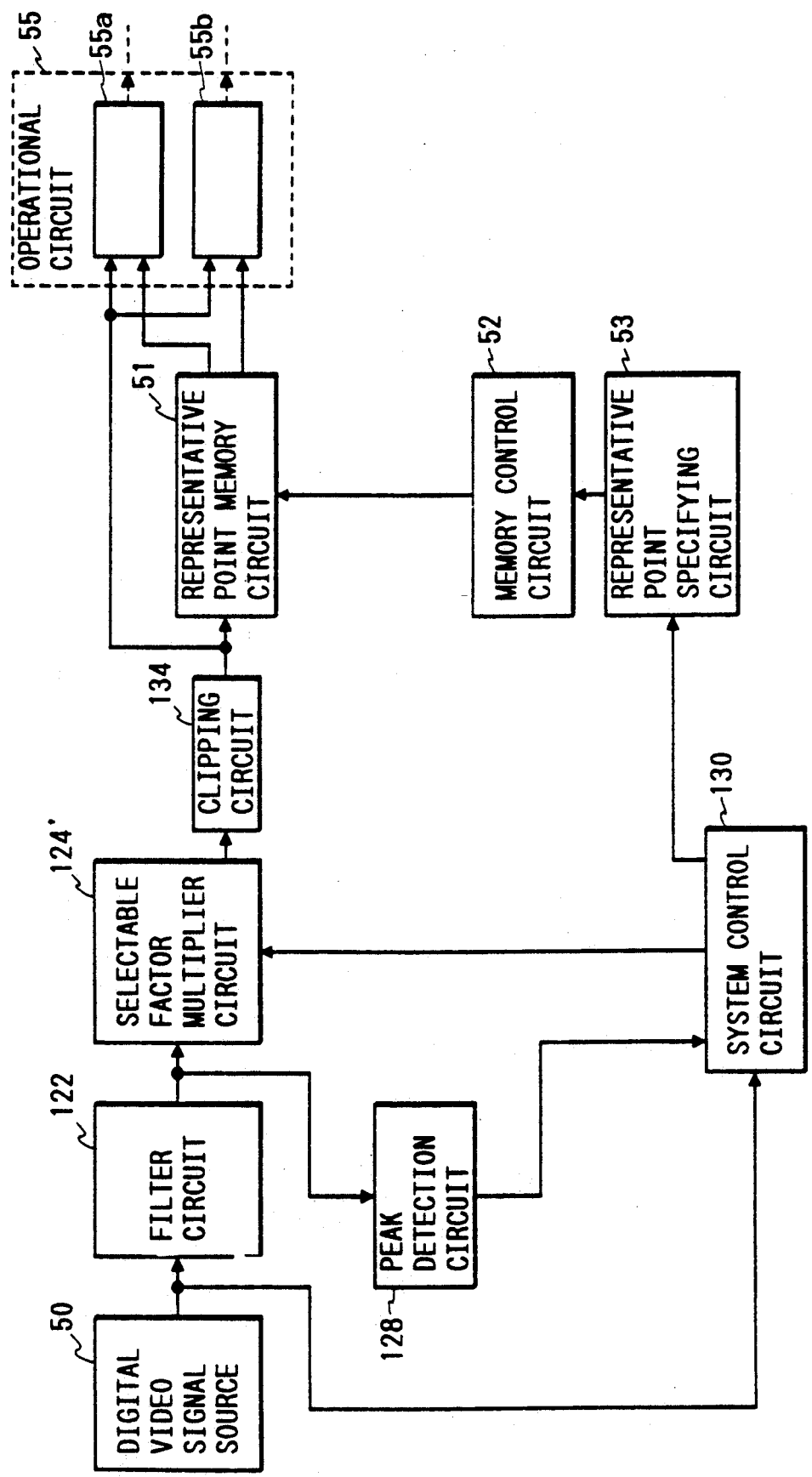
FIG. 19 is a partial block diagram of a fourth embodiment of a motion amount detection apparatus according to the present invention, showing a signal level control circuit.

FIG. 19 is a partial block diagram of a fourth embodiment of a motion amount detection apparatus according to the present invention. This embodiment differs from the third embodiment of FIG. 15 above only in that the latch circuit 132 of FIG. 15 is omitted, and in that the selectable factor multiplier circuit 124' of this embodiment does not include the selector circuit 124b shown in FIG. 16. Alternatively, the selectable factor multiplier circuit 124' of this embodiment can be formed as shown in FIG. 17, but with the selector circuit 124b omitted.

With this fourth embodiment, if there is a change in the peak signal level values that are detected by the peak detection circuit 128 between two successive fields, then there is a possibility that the representative point values that are outputted from the representative point memory circuit 51 during the current field will have been multiplied by a different multiplication factor than the representative point values that are outputted from the clipping circuit 134 during the current field. Thus in such a case, erroneous comparison results may be obtained from the operational circuit 55. However if that is a significant problem, it could be overcome by providing a circuit for detecting the occurrence of an excessive amount of change in the values of detected peak level values from the peak detection circuit 128 between two successive fields, and for causing the comparison results obtained from the operational circuit 55 in such a case to be discarded. Erroneous operation resulting from the functioning of the selectable factor multiplier circuit 124' can thereby be prevented.

What is claimed is:

1. A motion amount detection apparatus for operating on successive picture element values of an input digital video signal to detect amounts of relative motion between picture contents of sequentially occurring fields of said input digital video signal, comprising:

representative point specifying means (53, 52) for specifying respective positions of a plurality of representative points within each field of said input digital video signal;

a first memory circuit (51) controlled by said representative point specifying means for operating during a current field of said input digital video signal to store respective picture element values of said plurality of representative points of said current field while outputting each representative point value of a preceding field during a corresponding comparison interval, said corresponding comparison interval extending prior to and subsequent to the corresponding representative point;

first operational circuit means (55) operating during each said corresponding comparison interval for comparing successive picture element values of the input digital video signal with the preceding field representative point value corresponding to said each corresponding comparison interval, to obtain respective sets of operational result values in each said corresponding comparison interval;

second operational circuit means (61) for deriving, for each of said sets of operational result values, a corresponding set of relative distance values, wherein each relative distance value is a binary number representing a relative distance between a picture element corresponding to an operational result value and the corresponding representative point;

a second memory circuit (63) formed of a plurality of memory circuit sections each having an identical number of addresses and each functioning to cumulatively store successive operational result values supplied thereto in respective addresses, each address for storing a result value being specified by a fixed set of low-order bits of the relative distance value corresponding to said result value;

selector circuit means (59) for transferring each of said operational result values to one of said plurality of memory circuit sections selected in accordance with a combination of states of a set of high-order bits of a corresponding one of said corresponding set of relative distance values, said set of high-order bits comprising at least the most significant bit of said corresponding one of the corresponding set of relative distance values; and motion amount detection circuit means (65) for periodically deriving an amount of relative picture motion, based on cumulative stored values contained in said second memory circuit.

2. A motion amount detection apparatus for operating on successive picture element values of an input digital video signal to detect amounts of relative motion between picture contents of sequentially occurring fields of said input digital video signal, comprising:

representative point specifying means (53, 52) for specifying respective positions of a plurality of representative points within each field of said input digital video signal;

a first memory circuit (51) controlled by said representative point specifying means for operating during a current field of said input digital video signal to store respective picture element values of said plurality of representative points of said current file while outputting each representative point value of a preceding field in a corresponding comparison interval, said corresponding comparison interval extending prior to and subsequent to the corresponding representative point;

first operational circuit means (55) operating during each said corresponding comparison interval for comparing successive picture element values of the input digital video signal with the preceding field representative point value corresponding to said each corresponding comparison interval, to obtain respective sets of operational result values in each said corresponding comparison interval;

second operational circuit means (61) for deriving, for each of said sets of operational result values, a corresponding set of relative distance values, wherein each relative distance value is a binary number representing a relative distance between a picture element value corresponding to an operational result value and the corresponding representative point;

divider means (91, 92) for dividing each value in each of said sets of relative distance values by a predetermined integer, to obtain respective division remainder values;

a second memory circuit (63) formed of a plurality of memory circuit sections each having an identical number of addresses and each functioning to cumulatively store successive operational result values supplied thereto in respective addresses, each address for storing a result value being specified by a set of low-order bits of the relative distance value corresponding to said result value;

selector circuit means (59) for transferring each of said operational result values to one of said plurality of memory circuit sections selected in accordance with a corresponding one of said division remainder values; and motion amount detection circuit means (65) for periodically deriving an amount of relative picture motion, based on cumulative stored values contained in said second memory circuit.

3. The motion amount detection apparatus according to claims 1 or 2, wherein each of said operational result values produced by said first operational circuit means is derived based on an amount of absolute difference between a picture element value of said current field and a representative point picture element value of said preceding field.

4. The motion amount detection apparatus according to claims 1 or 2, further comprising a signal level control circuit for controlling the level of said input digital video signal, said signal level control circuit including:

peak detection circuit means (128, 130) for detecting peak level values of said input digital video signal and for producing multiplication factor selection control data which vary in accordance with said peak level values;

latch circuit means (132) for temporarily holding said multiplication factor selection controlled data and for outputting, in a current field of said input digital video signal, delayed multiplication factor selection control data which were produced in said preceding field;

selectable factor multiplier circuit means including first multiplication factor selection circuit means (124a, 124c, 124e) responsive to said multiplication factor selection control data from said peak detection circuit means for multiplying said input digital video signal by a factor which is predetermined in accordance with said multiplication factor selection control data, to produce a first level-modified digital video signal, and second multiplication factor selection circuit means (124a, 124c, 124e) responsive to said delayed multiplication factor selection control data from said latch circuit means for multiplying said input digital video signal by a factor which is predetermined in accordance with said delayed multiplication factor selection control data, to produce a second level-modified digital video signal;

first clipping circuit means (134) for executing limiting of absolute values of said first level-modified digital video signal, and for supplying a resultant digital video signal to said first memory circuit (51), and second clipping circuit means (40) for executing limiting of absolute values of said second level-modified digital video signal, and supplying a resultant digital video signal to said first operational circuit means (55).

5. The motion amount detection apparatus according to claim 4, wherein said selectable factor multiplier circuit means further comprising means for removing a predetermined number of low-order bits, extending from a least significant bit, from each data value of said first and second level-modified digital video signals, before transferring said first and second level-modified digital video signals to said first and second clipping circuit means.

6. The motion amount detection apparatus according to claim 4, further comprising filter circuit means (122) for removing high-frequency components of said input digital video signal, and for supplying a resultant filtered input digital video signal to said selectable factor multiplier circuit means and to said peak detection circuit means.

7. The motion amount detection apparatus according to claims 1 or 2, further comprising a signal level control circuit for controlling the signal level of said input digital video signal, said signal level control circuit including:

peak detection circuit means (128, 130) for detecting peak level values of said input digital video signal and for producing multiplication factor selection control data which vary in accordance with said peak level values;

selectable factor multiplier circuit means including multiplication factor selection circuit means responsive to said multiplication factor selection control data from said peak detection circuit means for multiplying said input digital video signal by a factor which is predetermined in accordance with said multiplication factor selection control data, to produce a level-modified digital video signal; and clipping circuit means (134) for executing limiting of absolute values of said level-modified digital video signal, and for supplying a resultant digital video signal to said first memory circuit (51) and to said first operational circuit means (55).

8. The motion amount detection apparatus according to claim 7, wherein said selectable factor multiplier circuit means further comprises means for removing a predetermined number of low-order bits, extending from a least significant bit, from each data value of said level-modified digital video signals, before transferring said level-modified digital video signal to said clipping circuit means.

9. The motion amount detection apparatus according to claim 7, further comprising filter circuit means (122) for removing high-frequency components of said input digital video signal, and for supplying a resultant filtered input digital video signal to said selectable factor multiplier circuit means and to said peak detection circuit means.

* * * * *